United States Patent
Myung et al.

(10) Patent No.: US 9,741,149 B2
(45) Date of Patent: Aug. 22, 2017

(54) USER TERMINAL DEVICE FOR PROVIDING ANIMATION EFFECT AND DISPLAY METHOD THEREOF

(71) Applicant: SAMSUNG ELECTRONICS CO., LTD., Suwon-si (KR)

(72) Inventors: In-sik Myung, Incheon (KR); Taik-heon Rhee, Seoul (KR); Jong-woo Jung, Hwaseong-si (KR); Dong-bin Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 75 days.

(21) Appl. No.: 14/261,023

(22) Filed: Apr. 24, 2014

(65) Prior Publication Data

US 2014/0320507 A1 Oct. 30, 2014

(30) Foreign Application Priority Data

Apr. 26, 2013 (KR) .................. 10-2013-0046984
Oct. 7, 2013 (KR) .................. 10-2013-0119081

(51) Int. Cl.
*G06T 13/00* (2011.01)
*G06F 3/0484* (2013.01)
*G06F 3/0488* (2013.01)
*G06T 13/80* (2011.01)

(52) U.S. Cl.
CPC ............ *G06T 13/80* (2013.01); *G06F 3/0488* (2013.01); *G06F 3/04842* (2013.01); *G06F 2203/04805* (2013.01)

(58) Field of Classification Search
CPC ....... G06T 13/00–13/80; G06T 11/20–11/203; G06T 11/80; G06F 3/017; G06F 3/041–3/04897; G06F 2203/04808; A63F 2300/6607; A63F 2300/6623; H04M 1/72544
See application file for complete search history.

(56) References Cited

U.S. PATENT DOCUMENTS

| 8,160,651 B2 | 4/2012 | De Bast |
| 8,253,745 B1 | 8/2012 | Hahn et al. |
| 8,797,293 B2* | 8/2014 | Kim .................... G06F 3/04886 345/173 |

(Continued)

FOREIGN PATENT DOCUMENTS

| KR | 10-2007-0020965 A | 2/2007 |
| KR | 10-2007-0112986 A | 11/2007 |

(Continued)

OTHER PUBLICATIONS

Thorne, Matthew, David Burke, and Michiel van de Panne. "Motion doodles: an interface for sketching character motion." ACM SIGGRAPH 2007 courses. ACM, 2007.*

(Continued)

*Primary Examiner* — Daniel Hajnik
(74) *Attorney, Agent, or Firm* — Sughrue Mion, PLLC

(57) ABSTRACT

A user terminal device includes a display which displays a screen including an object drawn by a user, a sensor which senses user manipulation, and a controller which provides animation effects regarding the objects when a preset event occurs, and performs a control operation matching the object when an object is selected by user manipulation.

11 Claims, 47 Drawing Sheets

(56) References Cited

U.S. PATENT DOCUMENTS

| | | | |
|---|---|---|---|
| 2005/0091609 A1* | 4/2005 | Matthews | G06F 3/0482 |
| | | | 715/804 |
| 2005/0235208 A1* | 10/2005 | Arend | G06F 9/4446 |
| | | | 715/712 |
| 2007/0261003 A1 | 11/2007 | Reissmueller | |
| 2008/0077863 A1 | 3/2008 | Jong et al. | |
| 2008/0153551 A1 | 6/2008 | Baek et al. | |
| 2009/0089372 A1* | 4/2009 | Sacco | G06F 17/3089 |
| | | | 709/204 |
| 2009/0201297 A1* | 8/2009 | Johansson | G06T 13/40 |
| | | | 345/473 |
| 2010/0005418 A1 | 1/2010 | Miyazaki et al. | |
| 2010/0164877 A1* | 7/2010 | Yu | G06F 9/4443 |
| | | | 345/173 |
| 2011/0018880 A1* | 1/2011 | Whited | G06T 13/80 |
| | | | 345/473 |
| 2011/0022958 A1* | 1/2011 | Kang | G06F 9/4443 |
| | | | 715/716 |
| 2012/0185789 A1* | 7/2012 | Louch | G06F 3/0488 |
| | | | 715/769 |
| 2012/0268795 A1* | 10/2012 | O'Brien-Strain | G06Q 30/02 |
| | | | 358/1.18 |
| 2012/0306891 A1 | 12/2012 | Shaffer | |
| 2013/0055152 A1 | 2/2013 | Burt | |
| 2013/0120436 A1* | 5/2013 | Krishnaswamy | G06T 11/40 |
| | | | 345/594 |

FOREIGN PATENT DOCUMENTS

| | | |
|---|---|---|
| KR | 10-0793307 B1 | 1/2008 |
| WO | 2013/049406 A1 | 4/2013 |

OTHER PUBLICATIONS

Printout of Dec. 2011 screen shots of: http://microangelo.us/desk-top-icon/animated-icons.asp and http://www.microangelo.us/icon-editor.asp from Wayback Machine (Internet Archive www.archive.org).*

WebArchive Screenshot of Enlarged Animation Icon Frames from MicroAngelo website from Dec. 2011; http://microangelo.us/desk-top-icon/animated-icons.asp from Wayback Machine (Internet Archive www.archive.org).*

Search Report dated Aug. 18, 2014, issued by the International Searching Authority in counterpart International Application No. PCT/KR2014/003685.

Written Opinion dated Aug. 18, 2014, issued by the International Searching Authority in counterpart International Application No. PCT/KR2014/003685.

Communication dated Jan. 11, 2017 issued by the European Patent Office in counterpart European Patent Application No. 14787949.8.

* cited by examiner

USER TERMINAL DEVICE FOR PROVIDING ANIMATION EFFECT AND DISPLAY METHOD THEREOF

CROSS-REFERENCE TO RELATED APPLICATIONS

This application claims priority from Korean Patent Application No. 10-2013-0046984, filed on Apr. 26, 2013, and Korean Patent Application No. 10-2013-0119081, filed on Oct. 7, 2013, in the Korean Intellectual Property Office, the disclosures of which are incorporated herein by reference in their entirety.

BACKGROUND

1. Field

Devices and methods consistent with exemplary embodiments disclosed herein relate to a user terminal device and a display method thereof, and more specifically, to a user terminal device with which a user can provide animation effects and a display method thereof.

2. Description of the Related Art

Strengthened by electronic technological development, various types of electronic devices are being invented and disseminated. In particular, user terminal devices that a user can carry, such as mobile phone, PDA, tablet PC and laptop PC, are widely used lately.

Such user terminal devices can provide services to a user by using various applications. A user may select an icon displayed on a home screen or an application icon screen, and implement an application that he or she requests.

The 'home screen' is a basic screen provided by the user terminal device. For example, the first screen that is displayed when the user terminal device is turned on, completes booting and is ready to be used, may be a 'home screen'. The 'application icon screen' is the screen which arranges and displays icons of various applications installed on the user terminal device.

Accordingly, the user terminal device may display various screens through a display, and may interact with a user. However, the screens or the objects displayed on the screens provided by the user terminal device are limited to standardized formats. A user performs interaction only by using fixed shapes of icons or widgets provided from device manufacturers or software developing companies. Therefore, related art user devices have a problem in more efficiently satisfying the needs of a user for more varied and interesting experiences.

As a result, there is a need to provide a user terminal device which provides more varied and interesting interactions.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

According to an exemplary embodiment, a technical objective is to provide a user terminal device configured to provide animation effects and a display method thereof.

According to an exemplary embodiment, a user terminal device may include a display, an input configured to receive a drawing manipulation to create a first image related to an application and a plurality of second images, and a controller configured to display the first image on the display, consecutively display the plurality of second images when sensing a hovering manipulation on the first image, and implement the application when sensing a touch manipulation on the first image.

The plurality of second images may include a plurality of key frames drawn by a user in order to express animation effects.

The controller may consecutively display the plurality of second images according to a display order established by a user, when sensing the hovering manipulation on the first image.

The controller may display a name of the application while consecutively displaying the plurality of second images.

According to an exemplary embodiment, a user terminal device is provided, which may include a display configured to display a screen including image drawings, a sensor configured to sense user manipulation, and a controller configured to provide animation effects regarding the image drawings when a preset event occurs, and perform a control operation matching an image drawing when the image drawing is selected by the user manipulation.

According to an exemplary embodiment, a user terminal device is provided, which may include a display configured to display a screen including an object, a sensor configured to sense a touch with respect to the object, and a controller configured to provide first animation effects regarding the object when the object is touched, provide second animation effects when the touch on the object ceases, and perform a control operation matching the object.

The first and the second animation effects may include effects of consecutively displaying a plurality of key frames drawn by a user or effects of displaying a plurality of images according to an animation order established by the user.

According to an exemplary embodiment, a user terminal device is provided, which may include a display configured to display a widget, a sensor configured to sense a drawing manipulation, a receiver configured to receive situation information, a storage configured to store a plurality of objects created by the drawing manipulation, and a controller configured to update the widget by combining parts of the plurality of objects according to the received situation information.

The plurality of objects may include signs, numbers and characters, the widget may be a unified widget including the weather, the date, and the time, and the controller may create the unified widget by combining one or more of the signs, the numbers and the characters based on one or more of current time, weather, and date information.

According to an exemplary embodiment, a display method to be performed by a user terminal device is provided, which may include receiving an incoming drawing manipulation to create a first image related to an application and to create a plurality of second images, displaying the first image, consecutively displaying the plurality of second images when sensing a hovering manipulation on the first image, and implementing the application when sensing a touch manipulation on the first image.

The plurality of second images may include a plurality of key frames drawn by a user in order to express animation effects.

The plurality of second images may be consecutively displayed according to a display order established by a user.

The display method may additionally include displaying a name of the application along with the plurality of second images.

According to the above various exemplary embodiments, a user may control animation effects related to objects on various screens. Thus, since the user terminal device can be used more conveniently and interestingly, the esthetic sense and the user satisfaction can be greatly enhanced.

BRIEF DESCRIPTION OF THE DRAWINGS

The above and/or other aspects of the exemplary embodiments will be more apparent by describing certain exemplary embodiments with reference to the accompanying drawings, in which.

DETAILED DESCRIPTION OF EXEMPLARY EMBODIMENTS

Figure 1:
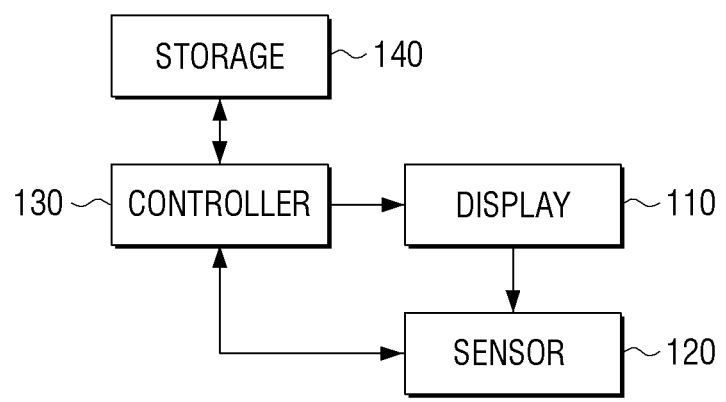
FIG. 1 is a block diagram of a user terminal device according to an exemplary embodiment.

Certain exemplary embodiments will now be described in greater detail with reference to the accompanying drawings.

In the following description, the same drawing reference numerals are used for the same elements even in different drawings. The matters defined in the description, such as a detailed construction and elements, are provided to assist in a comprehensive understanding of the exemplary embodiments. Accordingly, it is apparent that the exemplary embodiments can be carried out without those specifically defined matters. Also, well-known functions or constructions are not described in detail since they would obscure the exemplary embodiments with unnecessary detail.

FIG. 1 is a block diagram of a user terminal device according to various exemplary embodiments.

Referring to FIG. 1, the user terminal device 100 includes a display 110, a sensor 120, a controller 130 and a storage 140. The user terminal device 100 may be implemented as various types of electronic devices that can be used by a user. Specifically, the user terminal device 100 may be implemented to be any one of various types of devices such as a mobile phone, tablet PC, laptop PC, PDA, MP3 player, electronic frame apparatus, TV, PC and kiosk. FIG. 1 illustrates only the units performing operations regarding the various exemplary embodiments, and other detailed units are not described.

The display 110 is provided to display a screen including one or more objects. According to an exemplary embodiment, the term 'screen' refers to image frames provided through the display 110 in the user terminal device 100. Specifically, the screen may include a home screen, icon screen, list screen, application implementing screen, web browser screen, or contents playback screen. Further, the term 'object' refers to various shapes displayed within screens such as icons, characters, pictures, and widgets.

The sensor 120 may sense user manipulation performed with respect to the display 110. The user manipulation may be performed in various ways; for example, a hovering manipulation which is a technique in which a user puts a finger, a pen, or other implement near to the screen, or a gazing manipulation which is a technique in which a user gazes at an object within the screen, as well as normal touch manipulation.

When a user touches and draws on the screen with a finger or a pen, the sensor 120 may sense points or tracks objects which are drawn. The sensor 120 may be implemented as various types of touch sensors such as capacitive, resistive or piezoelectric. The capacitive sensing uses conductive material coated on the surface of the display 110, to sense micro-electricity excited by the user's body when a part of the user's body touches the surface of the display 110, and calculate touch coordinates. The compressive sensing includes two electrode plates included in the display 110, to sense electric currents when a user touches the screen, causing the upper and lower plates to contact each other on the touched point, and calculate touch coordinates. It is understood that other types of sensors, or combinations of the above sensors, may also be used in accordance with other exemplary embodiments.

The sensor 120 may sense user manipulation made with an input device such as a pen as well as user's fingers. When the input device is a stylus pen including coils, the sensor 120 may include a magnetic sensor to sense magnetic fields changed by the coils within the stylus pen. Accordingly, in addition to the touch manipulation, the manipulation approaching the screen, e.g., the hovering manipulation may be sensed. A constitution of the sensor 120 will be specifically explained below.

When the user manipulation is sensed, the sensor 120 transmits the sensing results to the controller 130. For example, when a user touches one point of the screen with his or her finger or pen, the sensor 120 transmits x and y coordinate values of the touched point to the controller 130. When a user moves the touched point while touching his or her finger or pen on the display 110, the sensor 120 transmits changed touch coordinate values to the controller 130 in real time. As described above, the sensor 120 may even sense an approach to the screen which is not a direct touch.

The storage 140 stores various programs or data used in the user terminal device 100. The storage 140 may store animation data to provide animation effects.

According to an exemplary embodiment, the term 'animation effect' refers to various effects to modify graphic objects displayed on the screen in an animated fashion and thereby increase user attention. The modifying may include various operations, such as position moving, color changing, shape changing, size changing, or sub-object adding. The animation data may include a plurality of key frames and a playback order of the key frames in order to create animation effects. The term 'key frame' refers to a plurality of pages of images constituting one animation. It is understood that the modifying may include other operations as well.

Such animation data may be created by a user, or may be default data internally provided from the user terminal device, or data received through an external server or a terminal apparatus.

In one example, when a user creates animation data, he may directly draw the above described key frames and create animation data regarding specific objects. As another example, a user may select various images or characters provided by the user terminal device as default data or data received from an external apparatus to be key frames, and establish a playback order of the key frames. In this case, animation data is created so that the display order of the key frames can be changed according to the playback order established by a user. Thus, when the animation data is played, the key frames selected by a user may be played consecutively according to the playback order established by a user to implement animation effects.

The controller 130 may control a general operation of the user terminal device 100. Specifically, the controller 130 may determine whether an event to be provided with animation effects occurs or not regarding objects included in the screen displayed on the display 110. If an event is determined to occur, the controller 130 may provide animation effects by using the animation data stored in the storage 140. For example, when a plurality of key frames drawn by a user are stored in the storage 140, the controller 130 may display a plurality of key frames consecutively, and provide visual effects so that the user feels as if he is watching an animation.

Further, when it is determined that an object is selected by the user manipulation sensed by the sensor 120, the controller 130 performs the control operation matching the selected object. According to an exemplary embodiment, the term 'control operation' refers to an operation to perform various functions such as displaying the implementing screen by implementing applications or playback multimedia contents such as pictures or video. For example, when an icon matching one application is selected, the controller 130 implements the application and displays the implementing screen.

Additionally, the controller 130 may display a line on the display 110 according to the sensing results provided from the sensor 120. Specifically, within a whole display area of the display 110, the sensor 120 may render a line on a point corresponding to x and y coordinate values outputted from the sensor 120. Objects may include such lines. Objects may include various metaphysical images as well as characters, symbols and signs. Thus, a user may directly draw various objects by using the screen of the display 110 like a sketch book. A user may store the objects which he or she draws as key frames on the storage 140.

According to an exemplary embodiment, the controller 130 may match the objects which a user draws with a control operation selected by a user or animation effects information, and store the matched information in the storage 140.

Although FIG. 1 illustrates that the user terminal device 100 includes the display 110, the sensor 120, the controller 130, and the storage 140, a constitution of the user terminal device 100 may not be limited to this configuration. Accordingly, units may be added, modified or deleted according to other exemplary embodiments.

For example, since the sensor 120 senses user manipulation and receives incoming sensing results, the sensor 120 may also be referred to as an 'input'. Thus, the user terminal device 100 may include an input which receives incoming drawing manipulation to create a first image related with an application and a plurality of second images. Further, the storage 140 may be implemented to be included in the controller 130. Therefore, the first image and a plurality of second images may be stored in the storage 140. For example, the first image may be an icon indicating an application, widget, characters, or image. Further, a plurality of second images may be a plurality of key frames which a user draws to express animation effects.

The controller 130 may display the first image on the display 110. For example, the first image may be displayed on a home screen or an icon arranging screen. While the first image is displayed, when a specific event occurs, the controller 130 displays a plurality of second images consecutively on the display 110. According to an exemplary embodiment, there are various types of events. For example, there may be event of a user performing hovering manipulation or gazing manipulation, or an event that a preset time period approaches.

According to an exemplary embodiment, a display order of the second images may be established by a user. In this case, establishing information regarding the display order may be stored in the storage 140. When the above described event is established to be hovering manipulation, the controller 130 may display a plurality of second images consecutively according to the display order established by a user when the hovering manipulation on the first image is sensed. Further, while displaying a plurality of second images, the controller 130 may display a corresponding application name together. These exemplary embodiments will be specifically explained with drawings below.

According to an exemplary embodiment, the controller 130 may implement a corresponding application when user manipulation to select the first image is inputted. Selecting the first image may be performed by touch manipulation; however, the selecting of the first image is not limited to herein.

Figure 2:
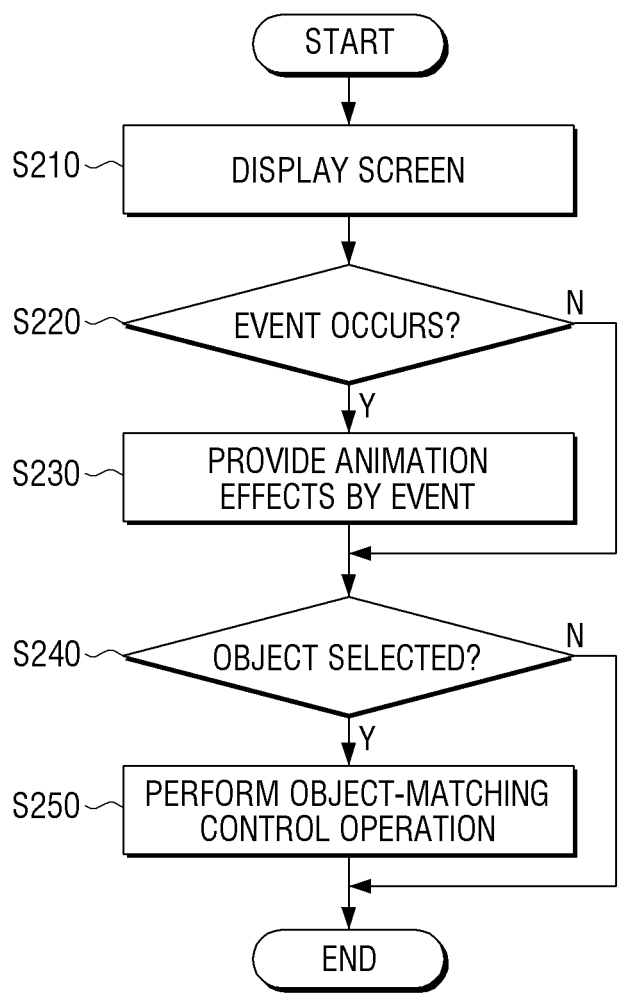
FIG. 2 is a flowchart provided to explain a display method of a user terminal device according to an exemplary embodiment.

FIG. 2 is a flowchart provided to explain a display method of the user terminal device according to an exemplary embodiment. Referring to FIG. 2, the display 110 may display the screen at operation S210. In this situation, when a preset event occurs, at operation S220, the controller 130 provides proper animation effects according to the event, at operation S230. Types of events may be variously established.

For example, animation effects may be provided when a user performs events to perform various types of manipulations, such as touch manipulation, hovering manipulation, gazing manipulation, motion manipulation, and voice manipulation. Specifically, animation effects may be provided when various types of events occur, such as, for example, an event of a user touching objects, an event of a user moving an input device closer to objects within a preset distance range from objects, an event of a user gazing at objects, an event of a user performing a motion to trigger animation effects, or an event of a user speaking a voice command to trigger animation effects. Further, animation effects may be also provided when an event occurs in which a surrounding environment of the user terminal device changes. For example, animation effects may be provided when one or more of various types of events occur, such as, for example, an event of a user rotating or sliding the user terminal device, an event of a user moving to another position with the user terminal device, an event of the time passing, an event of a preset alarm time or a preset time period approaching, and an event of the weather changing.

Additionally, animation effects may be provided regarding an event of a new message, messenger or text message arriving, or an event of a system updating request, an error message, and informing message being generated. In summary, animation effects may be provided regarding various events, and types of animation effects may be established differently according to events or objects. Examples of specific animation effects per event will be described below. Meanwhile, when an object is selected at operation S240, the controller 130 may perform the control operation matching the objects at S250. Selecting may be performed using various methods.

For example, when touch manipulation is performed on the screen, the controller 130 may receive incoming touched coordinate values from the sensor 120. The controller 130 compares pixel coordinate values of each object being displayed on the screen with the touched coordinate values. As a result of comparison, when the touched coordinate values are included within the display area of the object, a corresponding object is determined to be selected. For example, when an object matching the mail program is determined to be selected, the controller 130 may implement the mail program and display the implementing screen on the display 110. Such animation effects may be provided regarding objects on various screens. For example, as described above, the screen displayed on the display 110 may be various types such as a home screen, icon screen, list screen, application implementing screen, web browser screen, and contents playback screen. According to an exemplary embodiment, the term 'home screen' refers to a first displayed screen after the user terminal device 100 is turned on and the system ready operation is completed. Alternatively, the first displayed screen may be referred to by various other terms, such as a main screen, background screen, basic screen, or initial screen; the exemplary embodiments are described with the name of home screen, for exemplary purposes only.

The home screen may be a default home screen basically provided form a manufacturer of the user terminal device or a developer of an application, or a home screen which a user directly draws. Thus, a user may create a more interesting and unique screen by drawing objects on the home screen and adding animation effects to the objects. A home screen which a user can create may be named as a user creative screen (UCS) to be distinguished from the above defaulted home screen. A user may establish one of the default home screen and the user creative screen as a home screen by using a user setting menu. Further, another screen different from the home screen may be drawn and created by a user.

Additionally, according to an exemplary embodiment, the term 'icon screen' refers to a screen displaying icons of applications installed on the display 110, and the term 'list screen' refers to a screen arranging and displaying information regarding the applications in a list format. According to an exemplary embodiment, the term 'application implementing screen' refers to a screen rendered by implementing an application, and the term 'web browser screen' refers to a screen displaying web pages received from an external web server by implementing a web browser. The term 'contents playback screen' refers to a screen which performs playback of multimedia contents and displays the video frames. Additionally, the display 110 may display various types of screens, such as a combination of the above screens.

The method of providing animation effects or the display method according to various exemplary embodiments may be provided to various objects displayed on various types of screens.

According to an exemplary embodiment, as described above, when a user draws key frames and creates animation effects, such animation effects may be performed on the screen which a user draws.

Figure 3:
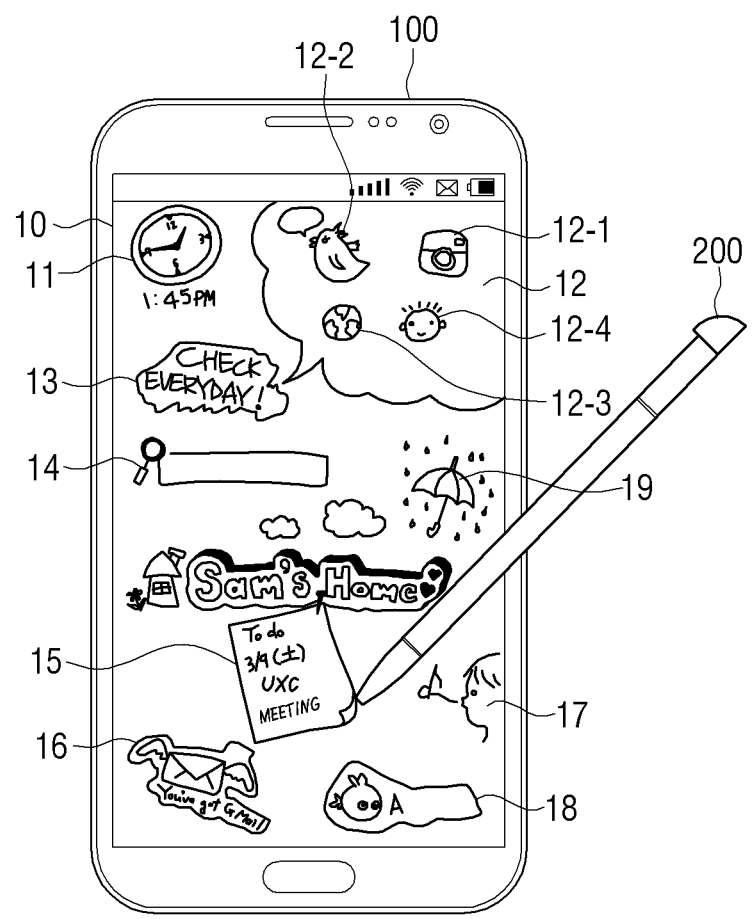
FIG. 3 illustrates an example of a home screen created by a user.

FIG. 3 illustrates an example of a screen which a user draws. For example, in a case that the user terminal device is turned on and a system ready operation is completed, or a case that an unlock motion is performed while being locked, when an event to display the home screen occurs, the controller 130 may display a home screen in a format shown in FIG. 3.

Referring to FIG. 3, various objects 11~19 are displayed on the home screen 10 of the user terminal device 100. Each of the objects 11~19 are drawn by a user on the home screen 10 with an input device, such as his or her finger or a pen 200. Therefore, displaying features such as a size, shape, position and color of the objects 11~19 may not be standardized, and may be variously expressed according to user intention. Each object may be described in an individual format or in a format to include a plurality of objects 12-1~12-4, such as an object 12.

A user may match a control operation that he or she requests regarding an object drawn by the user. When a user matches a control operation with each object, the controller 130 stores the matching information in the storage 140 or other storing device. Thereafter, when the displayed object is selected, the controller 130 performs the control operation matching the object based on the matching information.

If the object 12 including a plurality of objects 12-1~12-4 is selected, the controller 130 may perform a plurality of control operations matching each of the objects 12-1~12-4 included in the object 12 at once. Further, every object is not required to match a control operation, and some objects may be only used as pictures to satisfy visual feelings.

Further, although every object in FIG. 2 is drawn by a user, some objects which are default objects provided from the user terminal device 100 may be used. As described in FIG. 3, when a user draws objects by using the pen 200, more diversified objects may be drawn because a more detailed description can be performed compared to using a finger.

According to an exemplary embodiment, a user may create the home screen 10 in FIG. 3, and provide animation effects regarding one or more objects among the objects of the home screen 10. In this case, objects provided with animation effects are modified properly according to the event characteristics, such as by adding pictures which move when a preset event is performed. Animation effects may be implemented variously.

FIGS. 4 to 7 illustrate examples of various animation effects. Such animation effects may be provided when various events occur as described above. First, referring to FIG. 4, when a preset event occurs while a bird object 410 is displayed, the controller 130 consecutively displays a plurality of stored key frames 410-1~410-4 regarding the bird object 410.

If displaying positions of the key frames 410-1~410-4 are different from each other, when the first key frame 410-1 to the fourth key frame 410-4 are consecutively displayed, a user may observe animation effects, for example, that a bird flies in a direction indicated by the arrow. With the animation effects, the controller 130 may provide voice or vibration feedback effects together. Further, in addition to modifying the object 410, word balloons 411, 412 connected to the object 410 may be added to display characters. In this displaying operation, when a user selects a part of an entire area in which some or all of the key frames 410-1~410-4 are displayed, the controller 130 determines that a corresponding object 410 is selected. Accordingly, the controller 130 may perform the matched control operation with the selected object 410. For example, when the object 410 matches the messenger program, the messenger screen is displayed.

Figure 4:
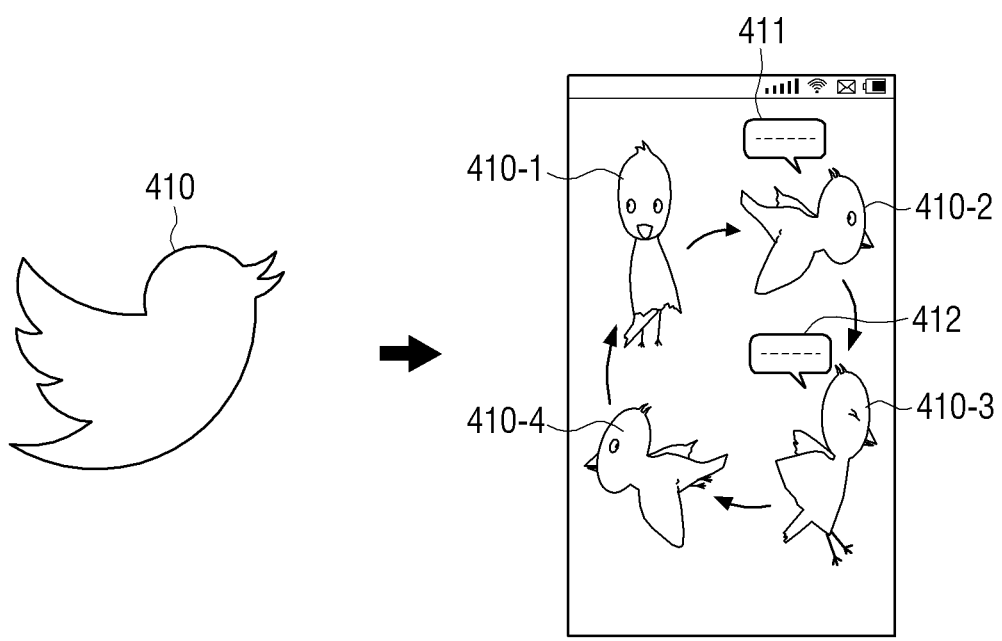
FIGS. 4 to 7 illustrate examples of various animation effects.
Figure 5:
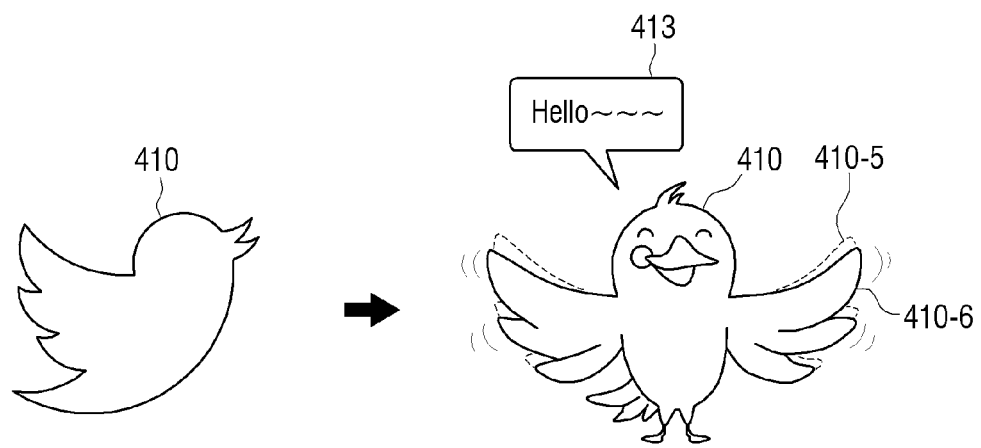

FIG. 5 illustrates different animation effects from those of FIG. 4. Referring to FIG. 5, when an event corresponding to the object 410 occurs, the controller 130 consecutively displays a plurality of key frames 410-5, 410-6 which are drawn in different shapes on the same position. Because the two key frames 410-5, 410-6 are different from each other in terms of the displaying position of the wings, when the two key frames 410-5, 410-6 are rapidly consecutively displayed, a user may observe animation effects of a bird flapping its wings. In this displaying operation, when the object 410 is selected, the controller 130 performs the matched control operation with the object 410. According to an exemplary embodiment, when the key frames are displayed on the original object position or overlapped with the original object, the controller 130 may delete the original object display before the key frames are displayed.

Further, the controller 130 may consecutively display the key frames on a surrounding area of the original object and provide animation effects to harmonize the original object with the key frames.

Additionally, animation effects may be implemented in various shapes.

Figure 6:
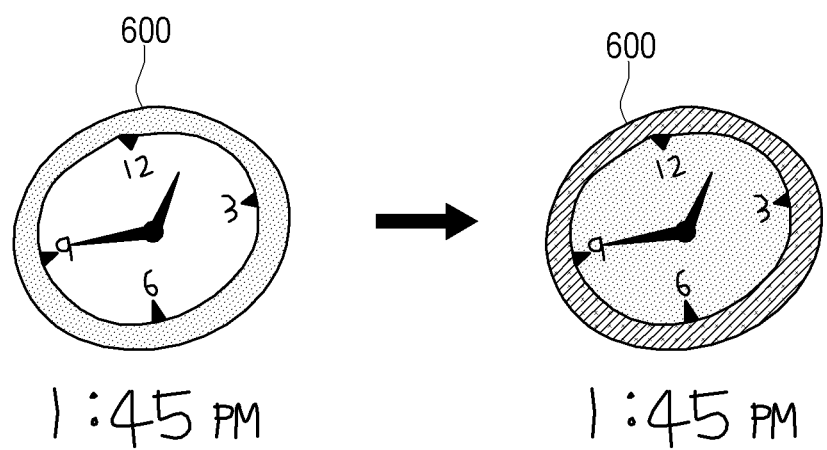
Figure 7:
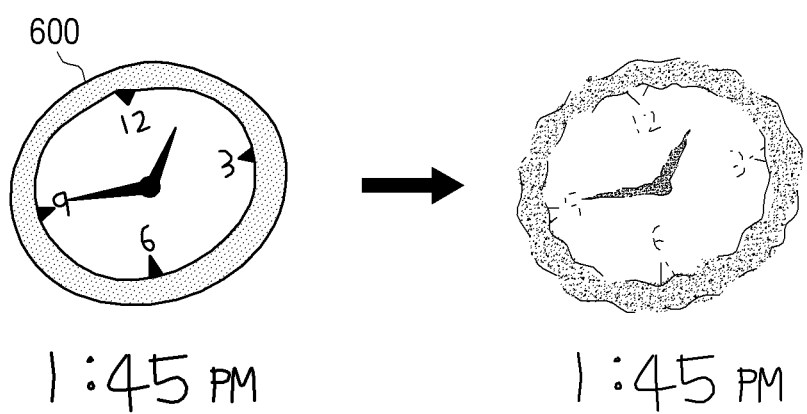

FIG. 6 illustrates a clock object 600. When a preset event occurs, the controller 130 may modify the color of the clock object 600. Further, as illustrated in FIG. 7, when a preset event occurs, the controller 130 may add water wave visual effects to the clock object 600. Such special effects may be various type of effects such as pushing visual effects or blowing and bursting visual effects in addition to wave visual effects. Thus, animation effects may be implemented in various methods, e.g., position moving, color modifying, shape modifying, size modifying, and sub-object adding. As described above, some animation effects may be provided by using the key frames which a user draws.

Figure 8:
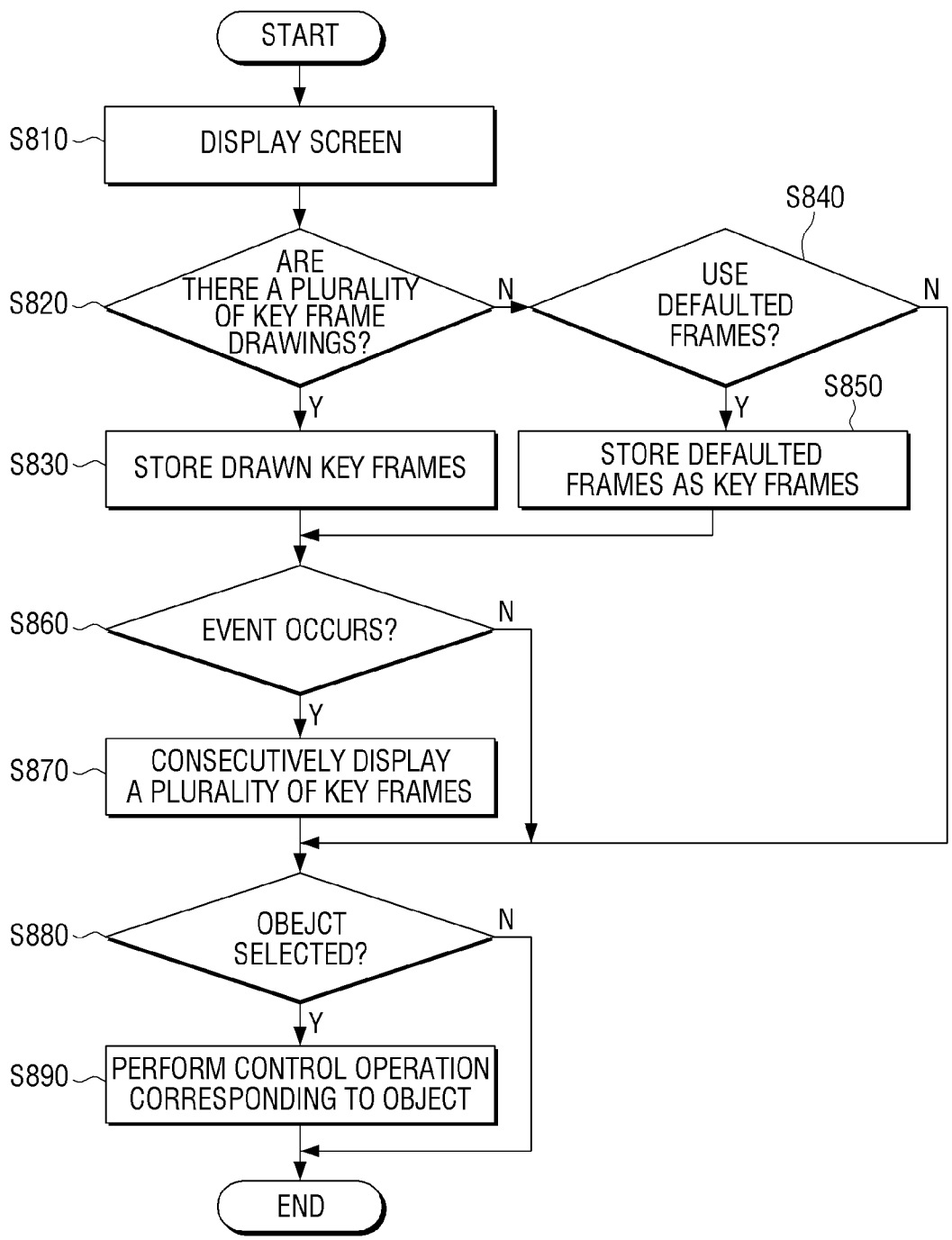
FIG. 8 is a flowchart provided to explain a display method according to an exemplary embodiment of using key frames which a user draws.

FIG. 8 is a flowchart provided to explain an exemplary embodiment in which a user draws a plurality of key frames and provides animation effects. Referring to FIG. 8, the user terminal device 100 displays the screen at operation S810. A user may draw a plurality of key frames on the screen. When the key frames are drawn at operation S820, the controller 130 stores the key frames in the storage 140 at operation S830. Meanwhile, when a user does not draw key frames at operation S820, the controller may determine automatically or passively whether default frames may be used. When the default frames are determined to be used at operation S840, the controller 130 may store the defaulted frames as key frames at operation S850.

At this point, when an event to be provided with animation effects occurs at operation S860, the controller 130 consecutively displays a plurality of the stored key frames at operation S870.

When an object is selected at operation S880, the controller 130 performs the matched control operation with the object at operation S890.

Figure 9:
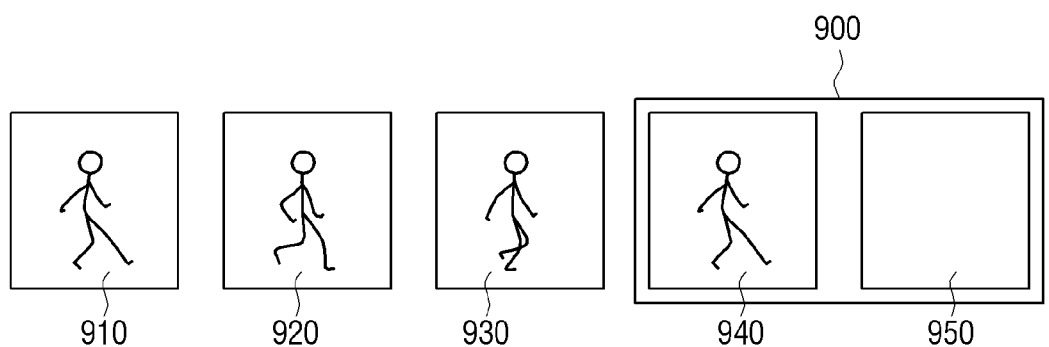
FIGS. 9 and 10 are provided to explain a process of drawing key frames.

FIG. 9 is a diagram provided to explain a process by which a user generates a plurality of key frames. Referring to FIG. 9, the controller 130 provides an empty canvass area 950 within screen 900 of the display 110. A user may draw a key frame on the canvass area 950 by using the pen 200 or other input device.

After drawing one key frame, when a user selects a specific menu or button to draw a next key frame or performs a preset user manipulation to draw the next key frame, the controller 130 moves the key frame which a user already draws to another area within the screen 900, and displays a new canvass area 950.

In this case, it may be implemented that the picture of the previous key frame is overlapped with a new canvass area or displayed in parallel within one screen 900 so that a user can draw a new key frame more conveniently. With these methods, a user may consecutively draw a plurality of key frames 910~940.

FIG. 9 illustrates that the empty canvass area 950 is displayed to enable a user to draw a next key frame after drawing the fourth key frame 940. When a user inputs a completing command after finishing drawing the key frames, the controller 130 stores all of the drawn key frames, and provides animation effects by using the stored key frames when an event occurs thereafter.

Figure 10:
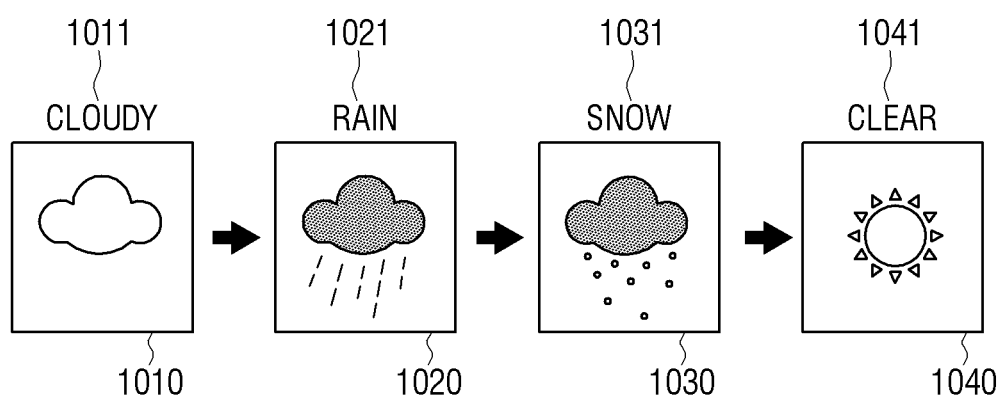

FIG. 10 illustrates another method of generating key frames. FIG. 10 illustrates a case in which animation data applied to a weather icon is generated.

Referring to FIG. 10, the controller 130 provides information 1011, 1021, 1031, 1041 regarding objects to be drawn before a user draws the objects and canvass areas 1010, 1020, 1030, 1040 on one side of the above information.

A user may conveniently draw key frames suitable for each of the information types 1011, 1021, 1031, 1041 within each of the canvass areas 1010, 1020, 1030, 1040. Specifically, for example, regarding weather-related information types of cloudy 1011, rain 10210, snow 1031, and clear 1040, the key frames indicating the weather may be drawn. When a user inputs a completing command after finishing drawing, the controller 130 may bundle the drawn key frames 1010, 1020, 1030, 1040 according to the order and store them in the storage 140. For example, the key frames are stored in an animated GIF format, although it is understood that other formats may also be used.

Thereafter, when an event to provide the animation effects occurs, the controller 130 shows animation effects by playback of the key frames 1010, 1020, 1030, and 1040 which a user draws according to the order. Although FIG. 10 illustrates a case that the number of key frames 1010, 1020, 1030, and 1040 are limited to be 4, the number of key frames is not limited thereto, and may be various other numbers. Further, the number of key frames may increase according to a user command.

Figure 11:
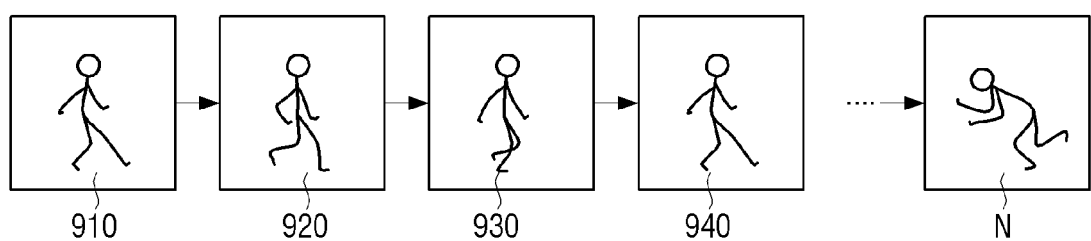
FIG. 11 is a diagram provided to explain a process of providing animation effects by using key frames which a user draws.

FIG. 11 illustrates an exemplary embodiment of providing animation effects by using a plurality of key frames drawn by a user. Specifically, FIG. 11 illustrates animation effects to use the key frames generated according to the method of FIG. 9.

As illustrated in FIG. 11, each of the key frames 910~N may be images describing similar objects with slight differences, for example, similar objects in different positions. The controller 130 stores each of the key frames 910~N in the storage 140. In this situation, when a specific event occurs, the controller 130 consecutively plays a plurality of key frames 910~N. In this case, a user may observe as if the object drawn by him or her moves because of an optical illusion.

Additionally, the controller 130 may provide various animation effects by modifying or rotating positions, sizes or shapes of objects. Further, the objects drawn by a user may not be limited to 2D objects and may alternatively be implemented as 3D objects. In addition, the controller 130 may provide animation effects to express physical effects such as light changes, wind effects, shadow changes, particle effects such as dusts or clouds, or movement effects of liquids or fluids such as water or oil. Further, the controller 130 may provide animation effects to modify colors or surface materials or highlight a display of the objects.

Such animation effects may be variously implemented according to types of events or types of objects. The following will specifically explain exemplary embodiments of providing animation effects according to various events.
Providing Animation Effects with Touch Manipulation Event FIG. 12 is a flowchart provided to explain a display method according to an exemplary embodiment of providing animation effects when a touch manipulation event occurs.

Figure 12:
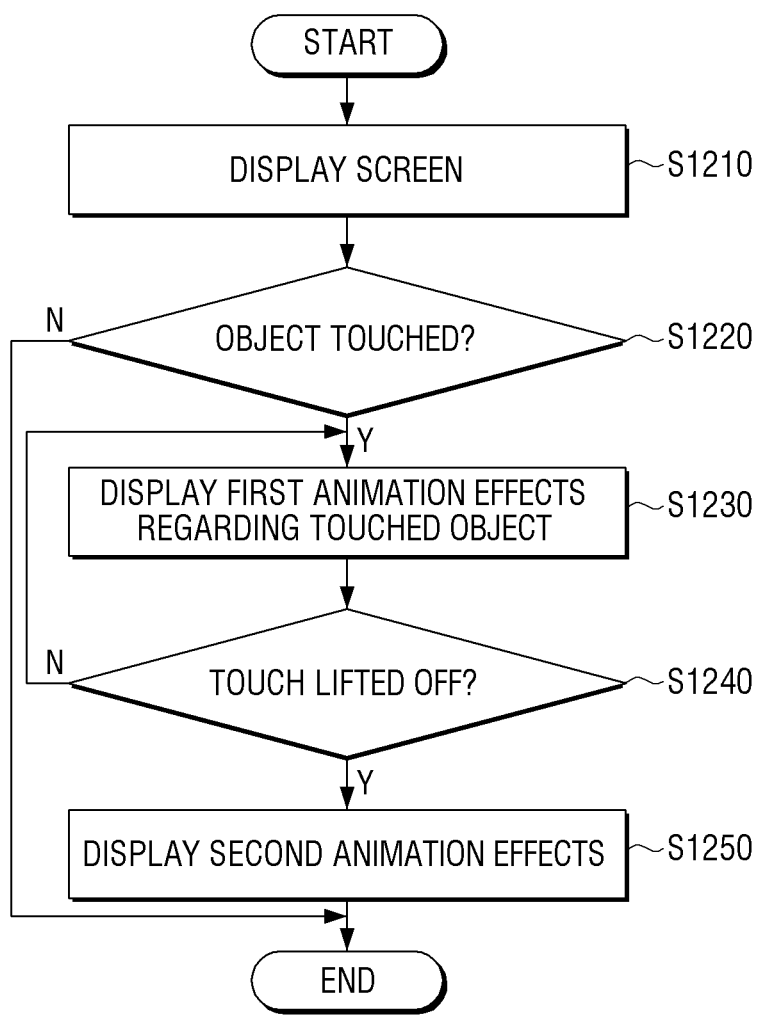
FIG. 12 is a flowchart provided to explain a display method according to an exemplary embodiment of providing animation effects by touch and lift-off manipulations.

Referring to FIG. 12, the user terminal device 100 displays the screen at operation S1210. Within the screen, one or more objects may be included. A user may touch an object by using various input devices such as a finger or pen at operation S1220.

The controller 130 may determine whether or not a corresponding object is touched through the sensor 120. When touching of the object is sensed, the controller 130 provides first animation effects regarding the object at operation S1230. The controller 130 may gradually display the first animation effects while the object is being touched. When the touch situation ceases at operation S1240, the controller 130 provides second animation effects at operation S1250. According to an exemplary embodiment, the term 'second animation effect' refers to effects providing different animations from the first animation effects.

Figure 13:
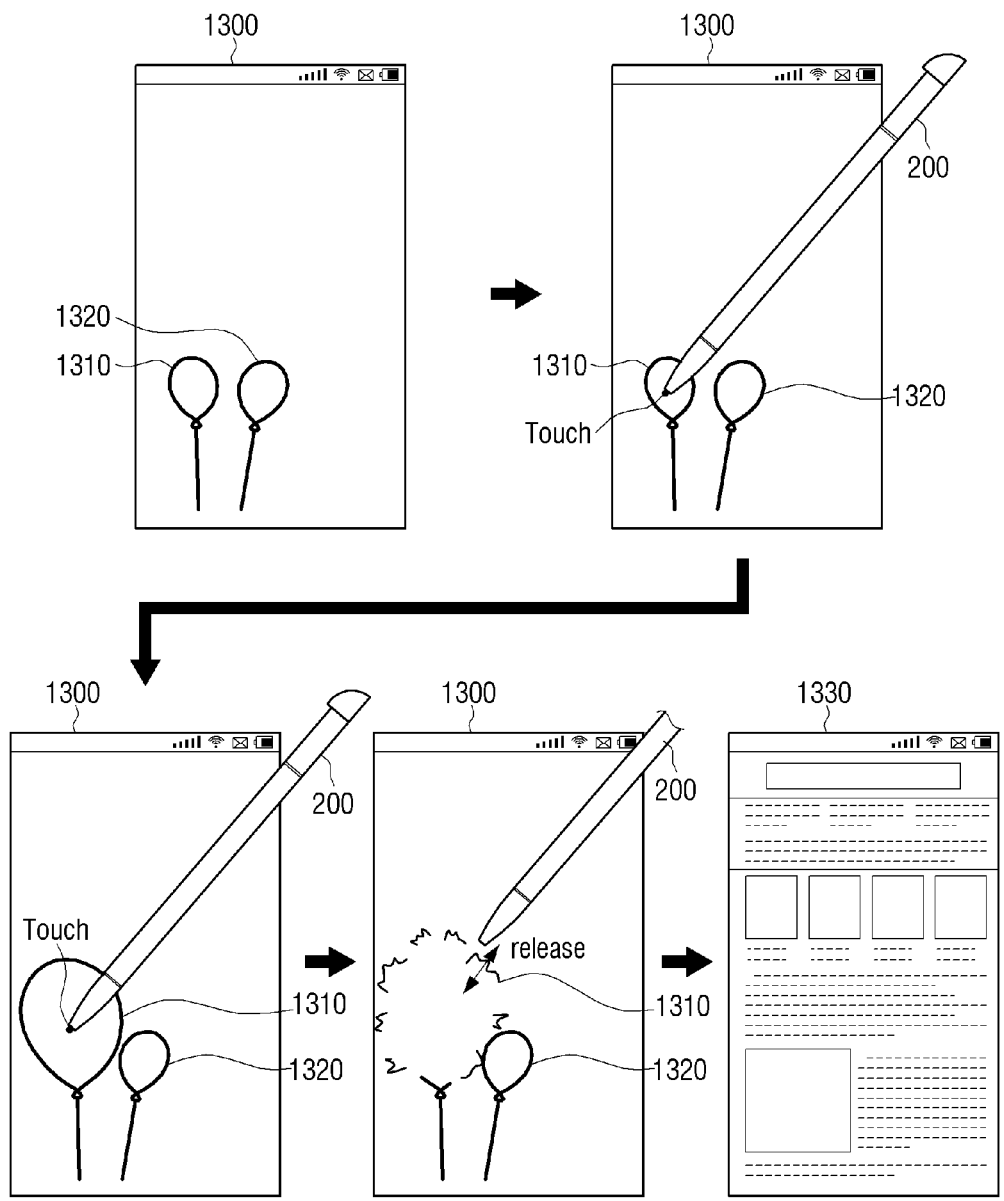
FIG. 13 is a diagram provided to explain a method of expressing animation effects in the exemplary embodiment of FIG. 12.

FIG. 13 is a diagram specifically explaining an operation of providing different animation effects according to touching or stopping the touching. Referring to FIG. 13, the controller 130 provides the first animation effects while the pen 200 is touching the object, provides the second animation effects when the pen 200 is lifted off from the object, and performs the control operation matching a corresponding object.

In FIG. 13, the first animation effects are implemented to expand the size of the object, and the second animation effects are implemented to modify the shape of the object. Specifically, when one of the balloon objects 1310, 1320 displayed within the screen 1300 is touched by the pen 200, the controller 130 provides the first animation effects to insert air into the touched object 1310, e.g., swelling of the balloon.

The controller 130 displays graphic effects to gradually increase the size of the object 1310 while the pen 200 is touching the object 1310, and to burst the balloon when the pen 200 is released from the object 1310. Further, the controller 130 performs the control operation matching the selected object 1310.

For example, when the object 1310 matches the web browser program, the controller 130 implements the web browser, accesses a preset address of the web server, and displays a web page screen 1330 provided from the web server, as illustrated in FIG. 13.

Although FIG. 13 illustrates a case of providing the first and the second animation effects which the size of the object is expanded and modified, such animation effects are merely one of various examples. Various modified formats can be provided. For example, as described in FIGS. 4 to 12, the first and the second animation effects may be implemented to consecutively display a plurality of key frames drawn by a user or to display a plurality of images according to the animation order determined by a user.

According to an exemplary embodiment, without using the input device directly, a user may show interest regarding the object in other ways as well, for example, by gazing at the object or other various methods. Thus, the controller 130 may provide animation effects according to various events as well as a touch manipulation event. The following will specifically explain an exemplary embodiment of providing animation effects according to different events from the touch manipulation event.

Providing Animation Effects with User Approaching Event

Figure 14:
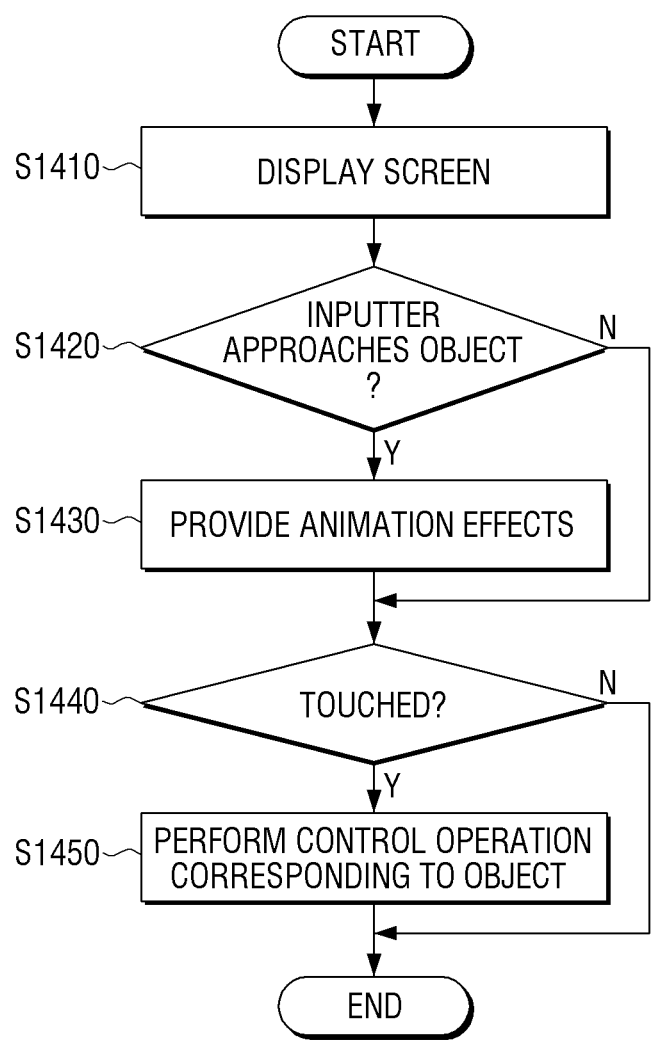
FIG. 14 is a flowchart provided to explain a display method according to an exemplary embodiment of providing animation effects by user approaching manipulation.

FIG. 14 is a flowchart provided to explain a controlling method of providing animation effects according to a user approaching event. Referring to FIG. 14, while the screen is being displayed at operation S1410, when the input device such as a user finger or a pen approaches an object at operation S1420, the user terminal device 100 provides animation effects regarding a corresponding object, at operation S1430. As described above, manipulation to move the input device to within a certain distance from the object may also be referred to as hovering manipulation.

When the hovering manipulation is determined to occur, the controller 130 may provide animation effects corresponding to the hovering manipulation. For example, to enable a user to simply recognize the control operation matching a corresponding object, the controller 130 may indicate the control operation information while displaying animation effects.

For example, information regarding the control operation may be displayed within the word balloons 411, 412, and 413 illustrated in FIGS. 4 and 5. In addition, various types of animation effects may be provided according to the hovering manipulation. When a corresponding object is directly touched while animation effects are provided at operation S1440, the controller 130 performs the control operation matching the object at operation S1450. According to the exemplary embodiment, the controller 130 may briefly imply which control operation will be performed before selecting an object directly, or activate using the application by encouraging interests in the object so that a user can select the object.

Figure 15:
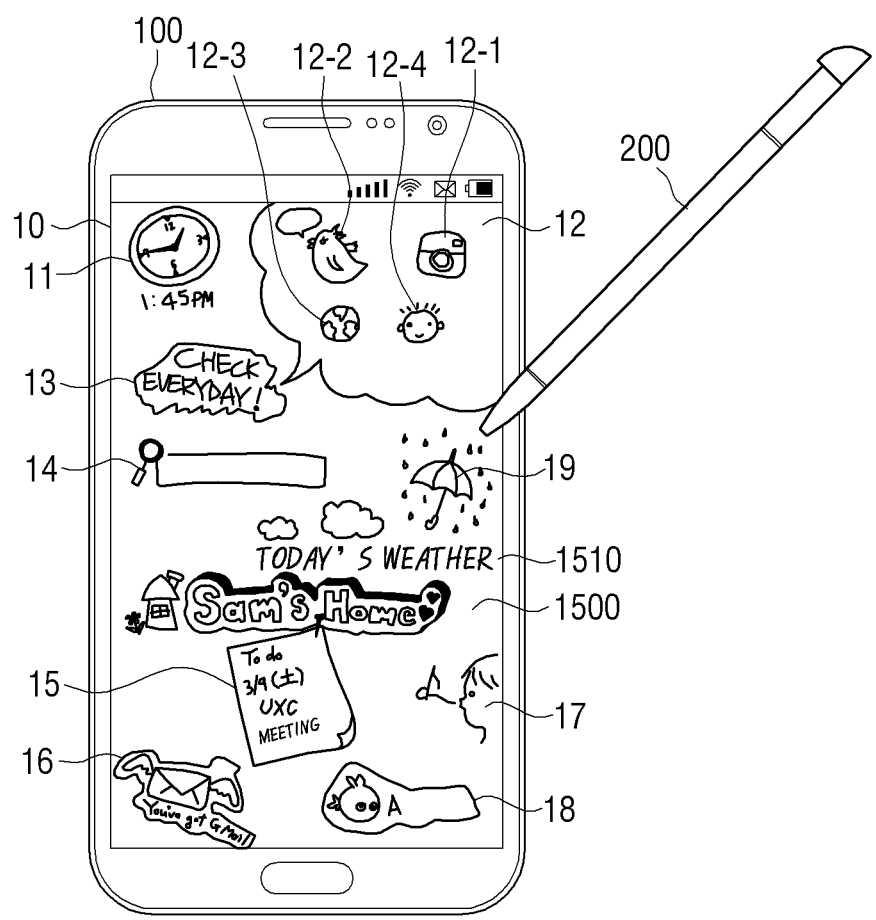
FIGS. 15 to 18 are provided to explain a method of expressing animation effects in the exemplary embodiment of FIG. 14.

FIG. 15 illustrates an example of animation effects provided according to the hovering manipulation. In FIG. 15, the home screen as illustrated in FIG. 3 is exemplarily displayed on the screen. Within the home screen 1500, various objects drawn by a user may be displayed.

When a user performs hovering manipulation by moving the pen 200 near to an object 19, the controller 130 displays a name 1510 of the application matching a corresponding object 19 on one side of the object 19. Accordingly, a user may easily ascertain the control operation that will be performed when each object displayed within the home screen 1500 is selected. FIG. 15 illustrates a case that corresponding object 19 matches the program of "Today's Weather." The program name may be gradually displayed while hovering is performed, or may be displayed in other fashions as well.

Although FIG. 15 illustrates that the program name is displayed on one side of the object 19, exemplary embodiments are not limited thereto. Thus, the program name may be displayed on a specific area within the screen 1500, or may be displayed on the object position while the shape of the object 19 disappears when the hovering manipulation is being performed according to exemplary embodiments.

Although FIG. 15 illustrates that the program name is displayed according to the hovering manipulation based on the home screen drawn by a user, the same exemplary embodiment may be implemented in various types of screens on which a user does not draw.

Figure 16:
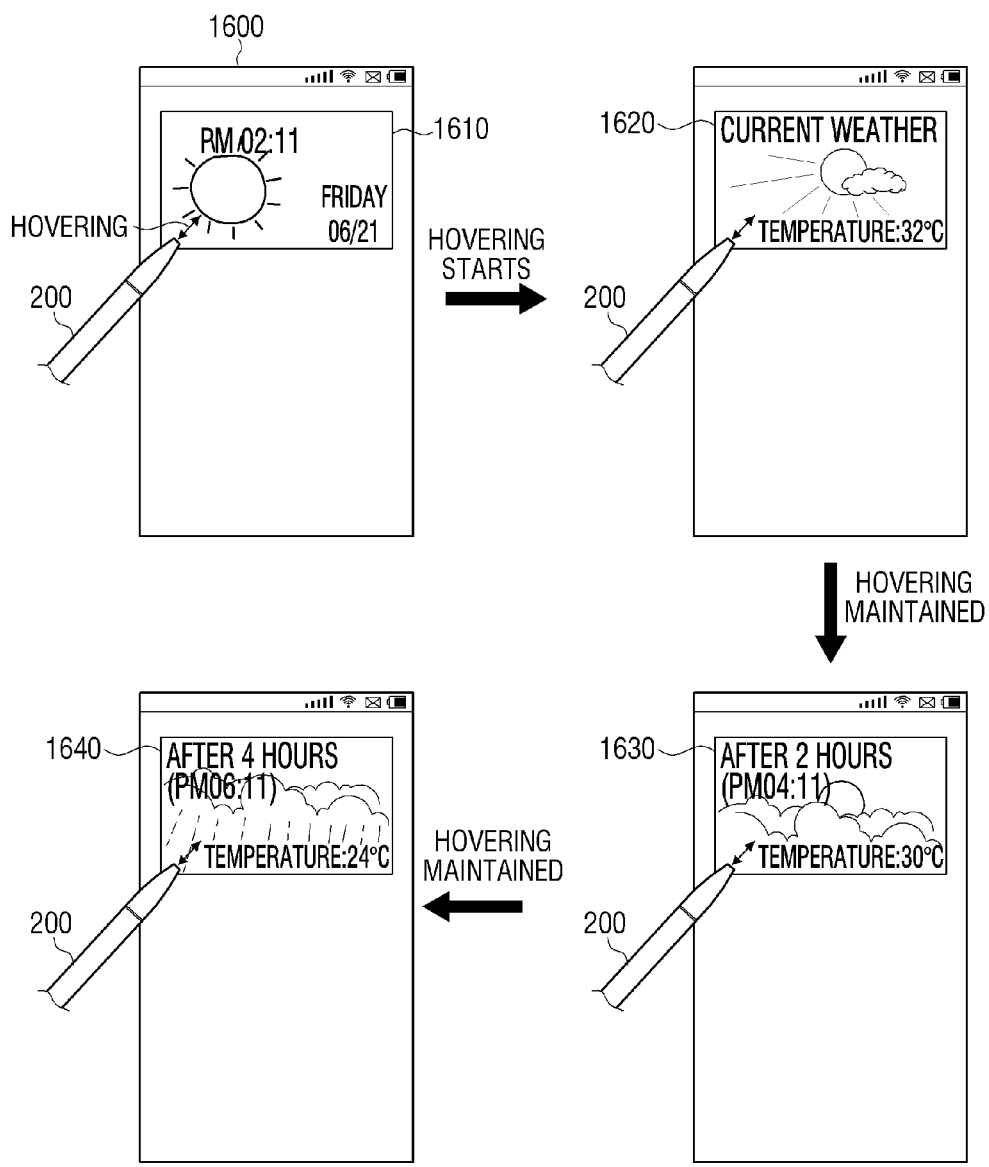

FIG. 16 illustrates another example of animation effects provided according to the hovering manipulation. Specifically, FIG. 16 illustrates an example of screen 1600 including widget 1610 which provides information such as the weather, the time and the day.

When a user performs the hovering manipulation regarding a corresponding widget 1610 while the widget 1610 of FIG. 16 is being displayed, the controller 130 provides animation effects to consecutively modify contents displayed on the widget 1610. Specifically, the controller 130 obtains weather information by implementing the program matching the widget 1610. Further, the controller 130 may display the weather changes as the time passes, such as, for example, the video animation on widgets 1610~1640, by using the key frames corresponding to the weather information.

FIG. 16 illustrates that the temperature changes are displayed through the widgets 1610~1640 in addition to the images indicating the weather changes.

According to the exemplary embodiment, a user may view the weather changes during a certain period (e.g., one day weather, one week weather, and one month weather) by performing the hovering manipulation for several seconds. In FIG. 16, a user may view that the weather is currently clear, will be cloudy after two hours, and will rain after four hours. Although FIG. 16 illustrates that the different key frames are displayed per two hours, time intervals of the key frames may be variously established.

Further, each key frame displayed on the widgets 1610~1640 may be drawn by a user or may be provided as a default. Further, each key frame may be provided from an external server or a terminal apparatus, e.g., via an Internet connection.

Figure 17:
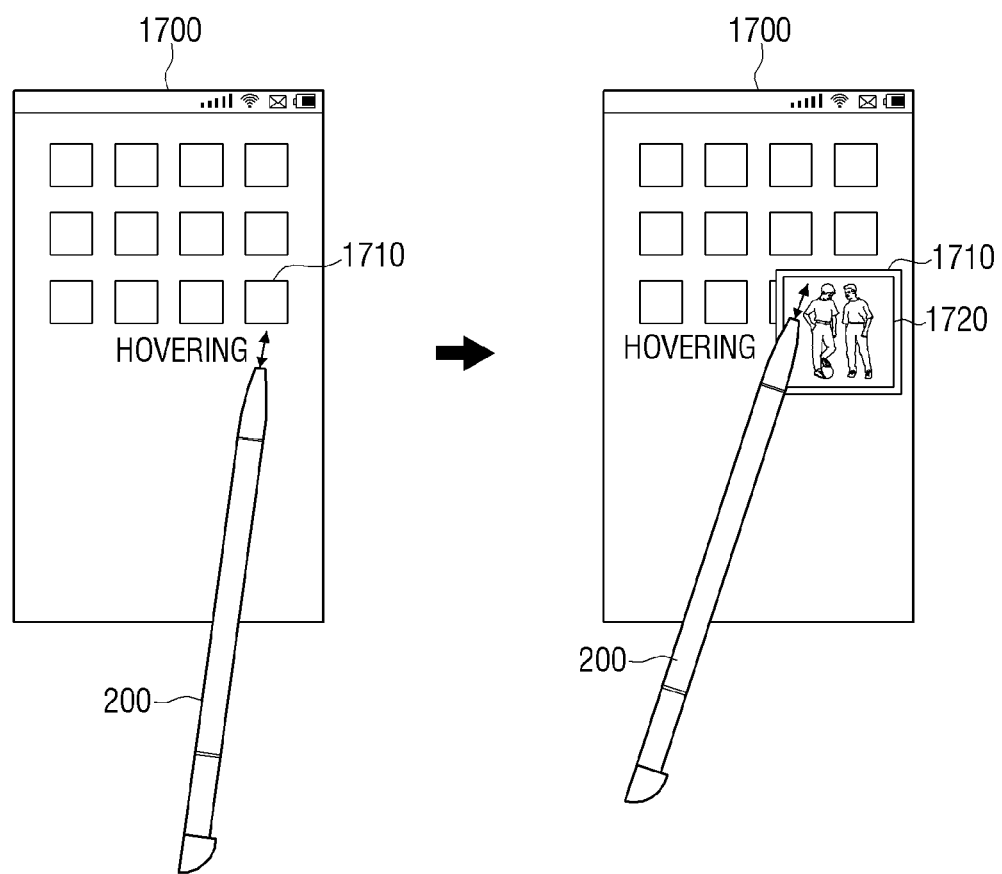

FIG. 17 illustrates another example of animation effects provided according to the hovering manipulation. FIG. 17 illustrates an example of the home screen displaying a plurality of icons or the application icon screen.

Referring to FIG. 17, when a user hovers with the pen 200 on an icon 1710 among a plurality of icons displayed on a screen 1700, the controller 130 expands the shape of the icon 1710, and marks a corresponding image 1720 to the icon 1710 within the icon 1710.

For example, when the icon 1710 is a folder icon storing a plurality of contents, the controller 130 may mark a thumbnail image regarding one of the contents among the stored contents in the folder within the expanded icon 1710. As another example, when a corresponding icon 1710 is a video icon, the controller 130 may play video corresponding to the video icon or an advertising video regarding the video, and mark a playback screen 1720 within the expanded icon 1710.

Figure 18:
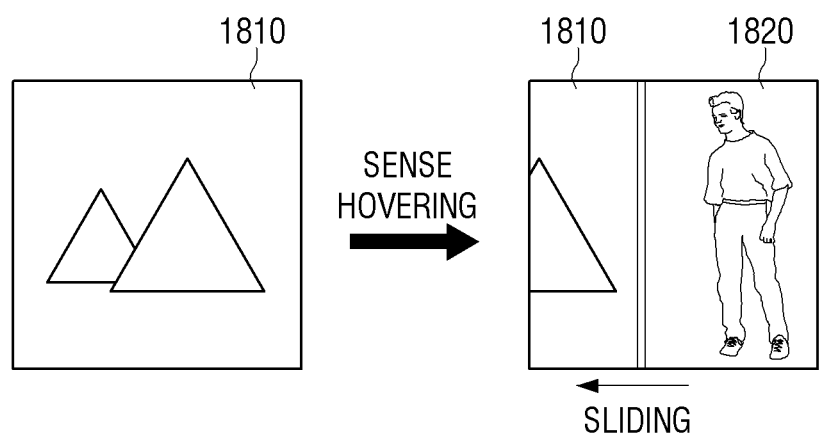

FIG. 18 illustrates another example of animation effects provided according to the hovering manipulation.

FIG. 18 illustrates that the program to view prestored pictures or video contents (e.g., a gallery program) is being implemented. When such a gallery program is implemented, the controller 130 displays one of the contents among the stored pictures or video contents on the screen of the display 110.

When the hovering manipulation is sensed in the above situation, the controller 130 implements a slideshow function to display a new image 1820 while sliding the image 1810 currently displayed toward one direction.

As described above, various animation effects may be provided regarding the hovering manipulation.

According to an exemplary embodiment, user manipulation may also include gazing manipulation during which a user gazes at the screen, as well as touch manipulation and hovering manipulation. The controller 130 may determine that an event to be provided with animation effects occurs when the gazing manipulation is sensed. The following will specifically explain an exemplary embodiment of providing animation effects according to the gazing manipulation.

Providing Animation Effects with Gazing Manipulation

Figure 19:
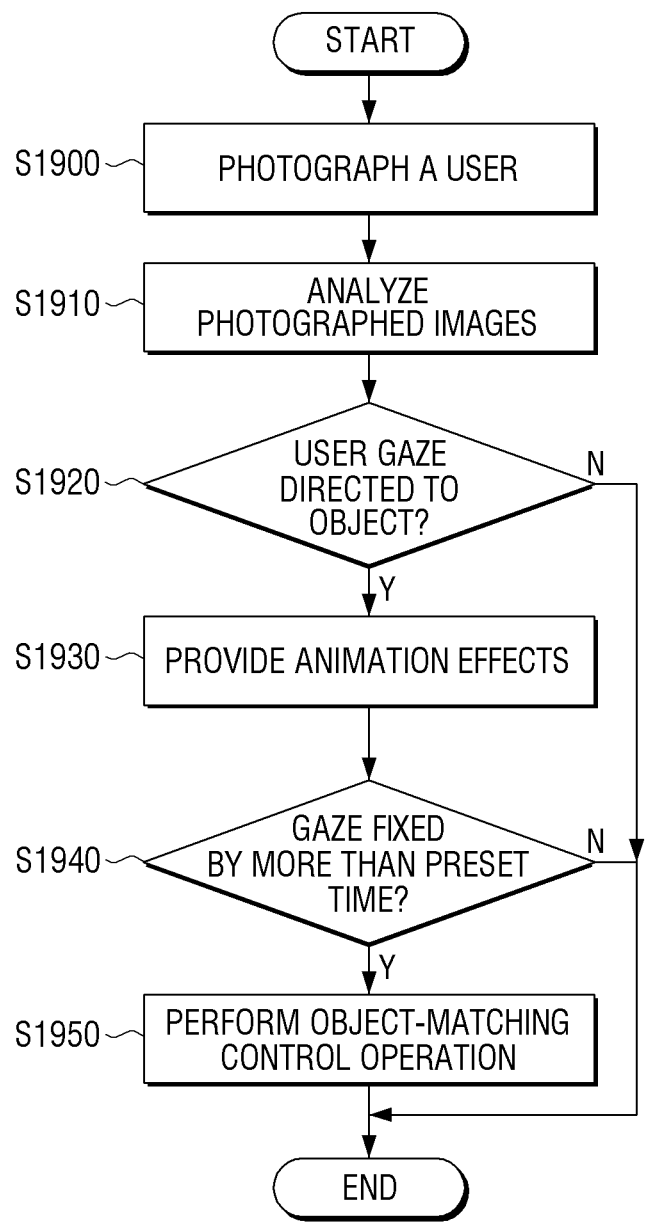
FIG. 19 is a flowchart provided to explain a display method according to an exemplary embodiment of providing animation effects by user gazing manipulation.

FIG. 19 is a flowchart provided to explain a controlling method of the user terminal apparatus which provides animation effects according to the gazing manipulation.

Referring to FIG. 19, the user terminal device 100 obtains photographed images by photographing a user at operation S1900. The controller 130 analyzes the photographed images at operation S1910 and determines whether the user gaze is directed towards an object at operation S1920.

When a result of operation S1920 indicates that the user's gaze points at an object, the controller 130 provides animation effects regarding the object at S1930.

When it is determined that the user gaze is fixed on the object for more than a preset time at operation S1940, the controller 130 performs the control operation of matching a corresponding object at S1950. Therefore, without using input separately, a user may implement the control operation that he or she requests by selecting an object conveniently.

Figure 20:
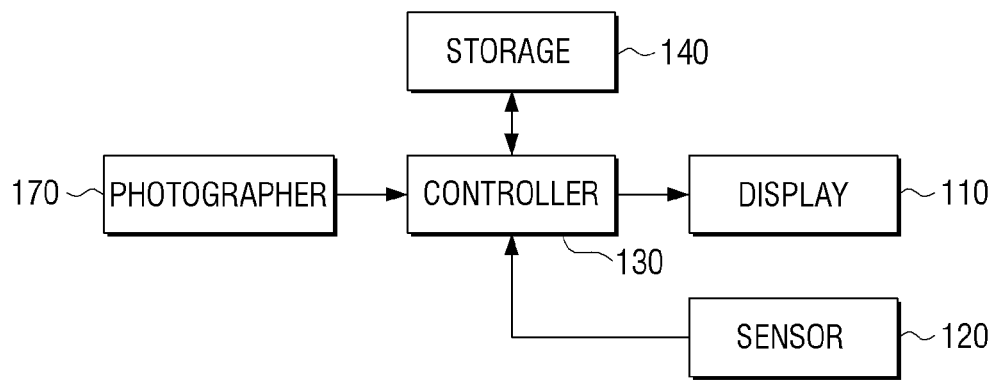
FIG. 20 is a block diagram of an example regarding a constitution of the user terminal device according to the exemplary embodiment of FIG. 19.

FIG. 20 is a block diagram of the user terminal device according to an exemplary embodiment. Referring to FIG. 20, the user terminal device 100 includes the display 110, the sensor 120, the controller 130, the storage 140, and a photographer 170 (e.g., camera).

Regarding the display 110, the sensor 120, the controller 130 and the storage 140, these components may, although are not necessarily required to, be implemented as substantially the same components previously described above with respect to other exemplary embodiments, overlapping descriptions with the above explanations in the other exemplary embodiments will therefore not be described herein.

The photographer 170 photographs a user and obtains photographed images. The photographer 170 may be included within the main body of the user terminal device 100 or connected to one side of the main body.

When the photographed images are obtained, the controller 130 analyzes the photographed images and tracks the user gaze. Therefore, it may be determined whether an event occurs, e.g., the user gaze points at an object on the screen. When a result of the determining indicates that the user gaze points at an object, the controller 130 provides animation effects regarding a corresponding object. Further, when the user gaze is fixed on the object for more than a preset time, the controller 130 may perform the control operation matching the object.

The controller 130 may track the user gaze by analyzing the photographed images according to various algorithms.

Figure 21:
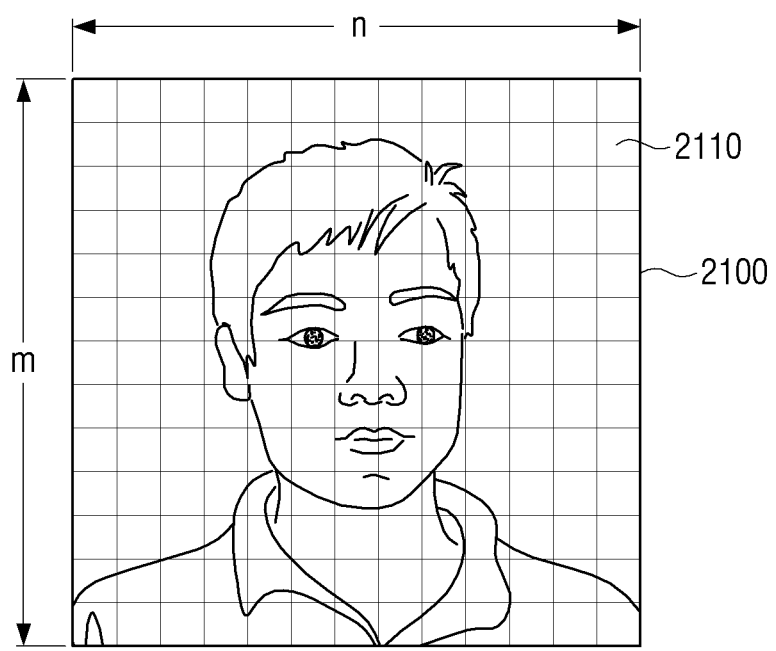
FIG. 21 is a diagram provided to explain a method of determining user gazing manipulation.

FIG. 21 is a diagram provided to explain an example regarding a method of analyzing the photographed images. Referring to FIG. 21, the controller 130 divides the photographed image 2100 horizontally and vertically and distinguishes the divided sections into a plurality of blocks. One block 2110 may include a plurality of pixels. The controller 130 determines whether the blocks constitute the same object by comparing the feature values with surrounded blocks after extracting feature values of the pixels included in each block. The controller 130 extracts an edge area of each object by performing the above determining per block. Further, by considering color, shape and size of each area divided according to the edge areas, the controller 130 consecutively extracts face area coordinates, eyeball area coordinates, iris area coordinates, and iris centered coordinates. Various algorithms and models may be applied to perform such extracting.

For example, the controller 130 may use the selective attention focused model regarding user images. The controller 130 may extract a face area by applying an SM (Saliency Map) model. The controller 130 extracts an eyeball area by using an AdaBoost algorithm from the extracted face area, and again extracts a pupil area from the extracted eyeball area. After extracting pupil centered coordinates from the extracted pupil area, the controller 130 maps the position of the pupil centered coordinates with the screen displayed on the display 110. Accordingly, the controller 130 determines which point the pupil centered coordinates are directed towards. Examples of gaze tracking algorithms are already published in various literature, and will not be further explained.

Figure 22:
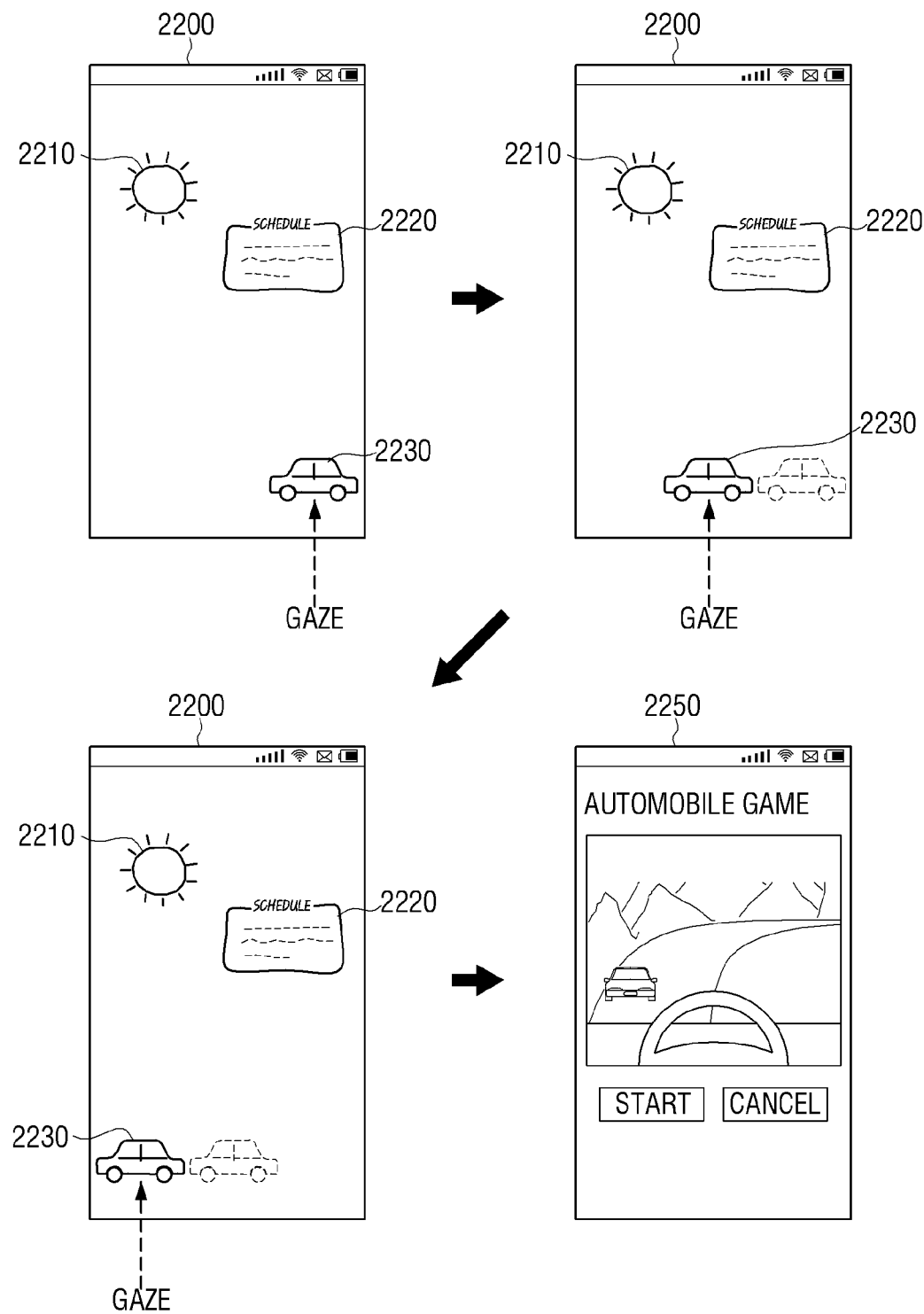
FIG. 22 illustrates an example of animation effects according to the exemplary embodiment of FIG. 19.

FIG. 22 is a diagram provided to explain a method of providing animation effects according to the gazing manipulation of a user. Referring to FIG. 22, while a plurality of objects 2210~2230 are being displayed on screen 2200, when a user gazes at one object, for example, 2230, the controller 130 provides animation effects regarding the object 2230.

FIG. 22 illustrates animation effects showing that the object 2230 is moving. Even when the position of the object 2230 moves, when a user is determined to continuously gaze at the object 2230 for more than a preset time, or when a user directly touches the object 2230, the controller 130 determines that the object 2230 is selected. Accordingly, the controller 130 performs the control operation matching the object 2230. Specifically, the controller 130 implements the matched application and displays the implementing screen 2250.

The above disclosure describes the exemplary embodiments of providing animation effects with user manipulation such as touching, hovering, and gazing; however, the controller 130 may provide animation effects according to various other types of events as well. For example, animation effects may be provided according to changes in environments where the user terminal device is used.

Providing Animation Effects with Environment Changes

Figure 23:
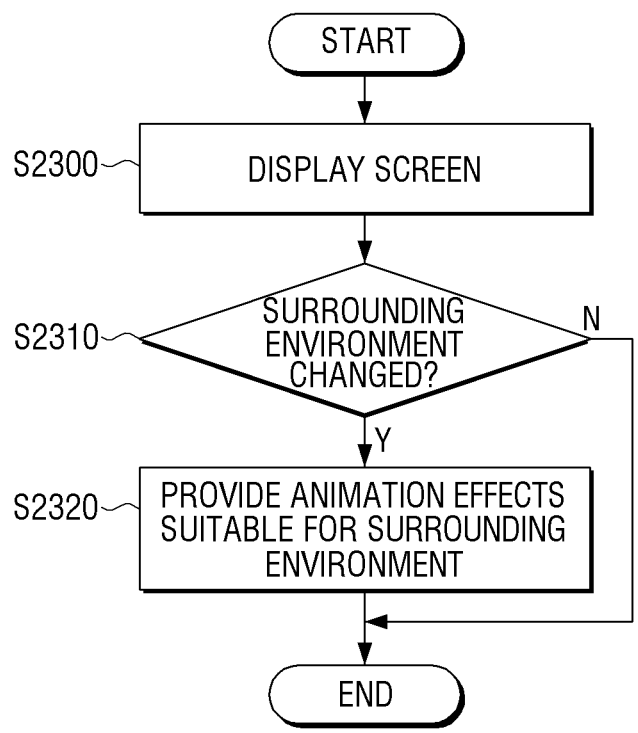
FIG. 23 is a flowchart provided to explain a display method according to an exemplary embodiment of providing animation effects by changes in surrounding environments.

FIG. 23 is a flowchart provided to explain a controlling method according to an exemplary embodiment of providing animation effects according to changes in environments. Referring to FIG. 23, while the screen is displayed at operation S2300, when there are changes in surrounding environments at S2310, the user terminal device 100 provides animation effects appropriate for the surrounding environments at operation S2320. The surrounding environments may be defined according to various conditions such as position, time, temperature, humidity, and weather.

The display method of FIG. 23 may be implemented in the user terminal device further including a receiver (not illustrated) in addition to the display 110, the sensor 120, the controller 130, and the storage 140. The receiver receives situation information from an external server or other terminal apparatuses. Situation information may include various types of information related to surrounding environments, such as weather, temperature, humidity, time and transport information. The controller 130 may modify objects displayed on the display 110 according to the situation information received through the receiver.

Figure 24:
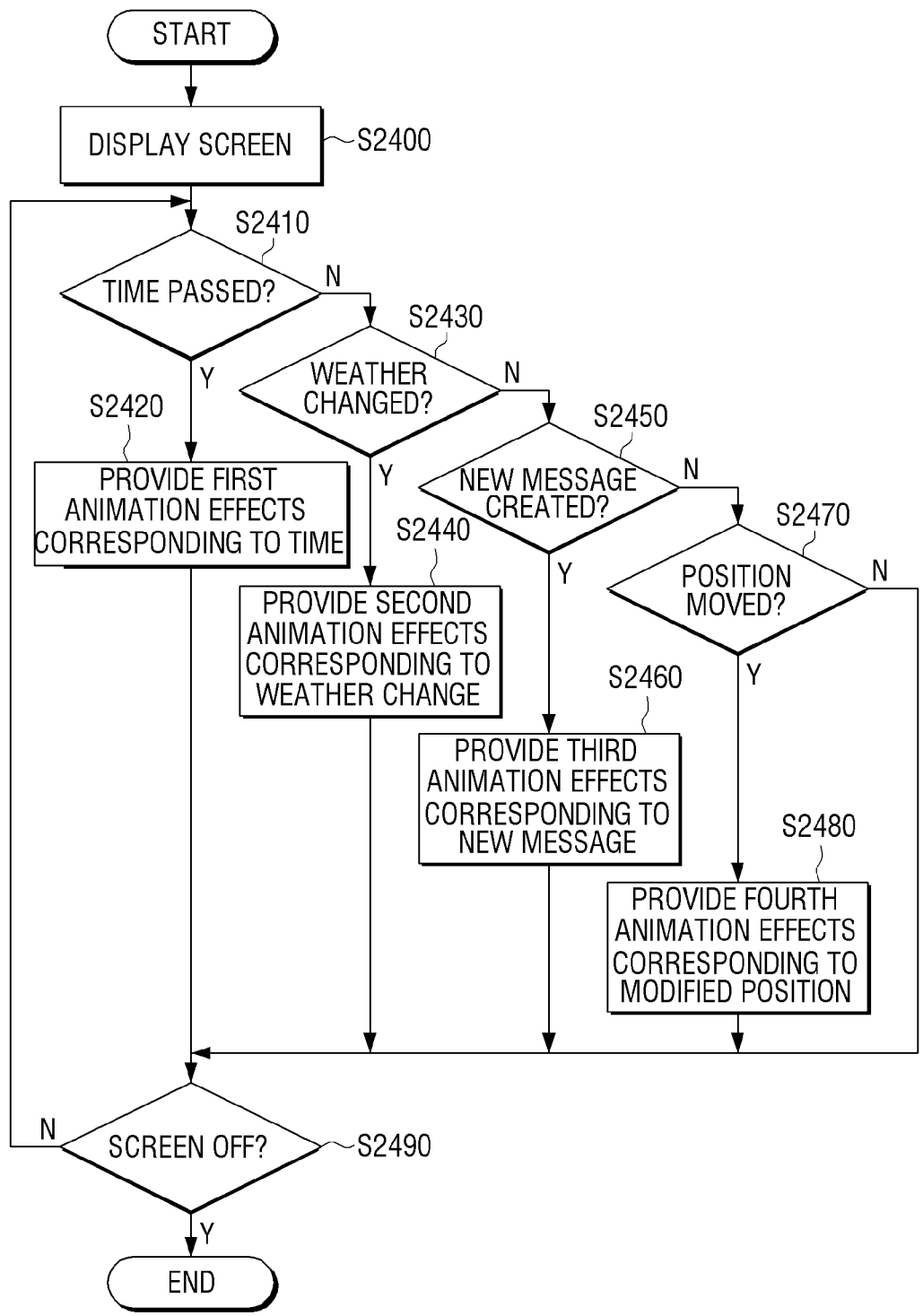
FIG. 24 is a flowchart provided to explain a display method according to an exemplary embodiment of providing animation effects by various situation changes.

FIG. 24 is a flowchart specifically explaining the exemplary embodiment of FIG. 23.

Referring to FIG. 24, while the user terminal device 100 displays the screen at operation S2400, when a predetermined time period passes at operation S2410, the controller 130 provides the first animation effects corresponding to the time passing at operation S2420. The controller 130 may directly count the time by using a timer (not illustrated)

included in the user terminal device 100, or receive time information from a communicating station or another server.

Further, when the weather changes at operation S2430, the controller 130 provides the second animation effects corresponding to the weather changing at operation S2440. The controller 130 may receive weather information from a broadcasting station or another server.

Further, in addition to the time or the weather, a new message, such as, for example, a new text message, e-mail or messenger message may be received, or a new message such as a message indicating an update of the stored program or contents may be received at operation S2450. The controller 130 may provide the third animation effects corresponding to the message at operation S2460 when the new message is received.

Further, the position of the user terminal device 100 may move at operation S2470. When the controller 130 senses movement of the position of the user terminal device 100, the controller 130 may provide the fourth animation effects corresponding to the moved position at operation S2480. The controller 130 may directly sense the position or movement of the user terminal device 100 by using a geomagnetic sensor or GPS chip included in the user terminal device 100.

Until the screen is determined to be off at operation S2490, the controller 130 may provide the first to the fourth animation effects corresponding to the monitoring results while monitoring the time, the weather, the arriving of a new message, or the movement of position. The above described first to fourth animation effects may be implemented in various formats.

Figure 25:
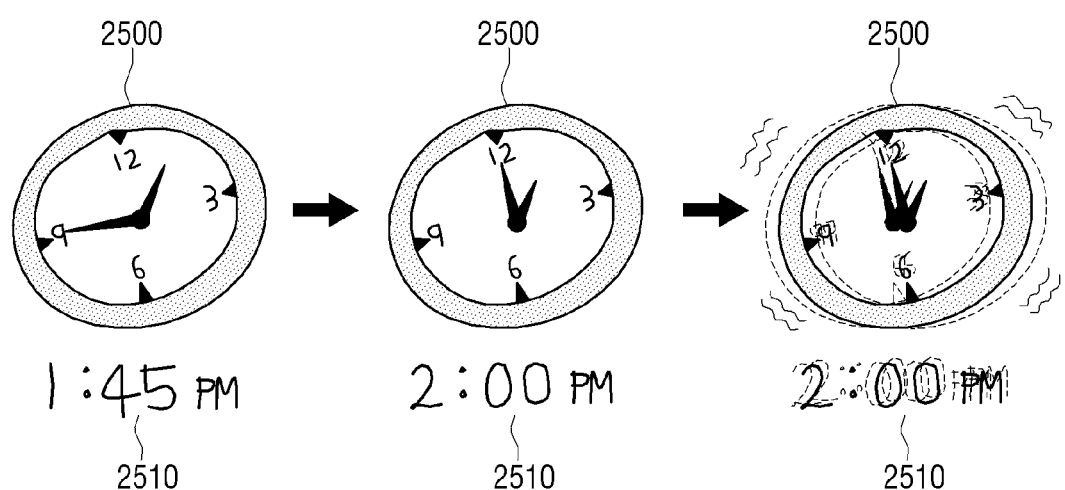
FIGS. 25 and 26 illustrate various examples regarding a method of providing first animation effects as time passes.

FIG. 25 illustrates an example of the first animation effects provided as the time passes. As described in FIG. 25, when an analogue clock 2500 and a digital clock 2510 are displayed, the controller 130 may modify the time shown by the analogue clock 2500 and the digital clock 2510 according to the time passing. Specifically, the controller 130 may express the time passing by automatically moving a minute hand, an hour hand, and a second hand within the analogue clock 2500.

Further, the controller 130 may express the time by displaying the numbers on the digital clock 2510 differently as the time passes. FIG. 25 consecutively expresses a process of the time going from 1:45 p.m. to 2:00 p.m.

The controller 130 may modify various characteristics of the analogue clock 2500 and the digital clock 2510, such as, for example, brightness, color, or shape of the analogue clock 2500 and the digital clock 2510 or background color and background image of the analogue clock 2500 and the digital clock 2510.

According to an exemplary embodiment, when a user sets an alarm to ring at 2:00 p.m., when the setting time is determined to arrive, the controller 130 may provide another animation effect, such as the effect of the analogue clock 2500 and the digital clock 2510 shaking, as illustrated in FIG. 25. The controller 130 may also provide alarm sounds and vibrations with such animation effects.

Figure 26:
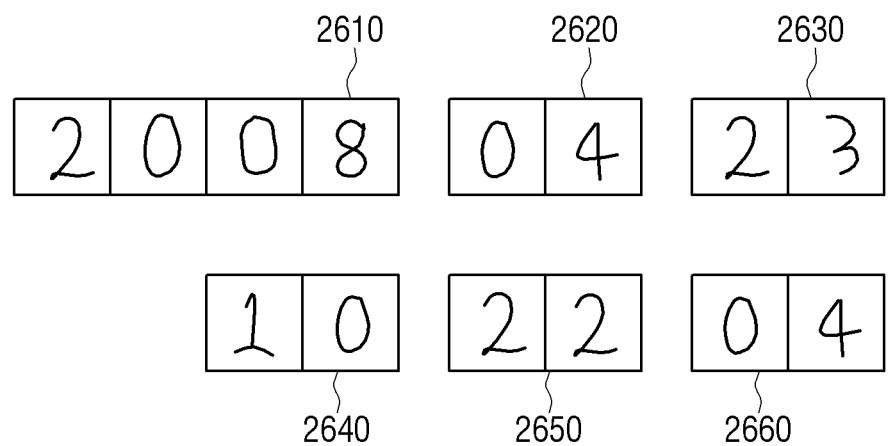

Calendar information as well as clock information may be provided in a similar method. FIG. 26 illustrates another example of the first animation effects provided as the time passes.

As illustrated in FIG. 26, the controller 130 displays digital calendars 2610, 2620, 2630 and digital clocks 2640, 2650, 2660 which are combined with a plurality of numbers. The controller 130 modifies the numbers displayed on the digital calendars 2610, 2620, 2630 and the digital clocks 2640, 2650, 2660 as the time passes.

Accordingly, a user may recognize a current time or current date through the objects on the screen.

According to an exemplary embodiment, the clocks or the calendars displayed in FIGS. 25 and 26 may be created by objects drawn by a user. The controller 130 may recognize a plurality of objects which a user draws and automatically apply proper animation effects to the objects. When a user draws the clock as illustrated in FIG. 25, the controller 130 compares the object information registered in the prestored object library with the shape drawn by a user. Therefore, when there is a similar object which exceeds a certain similarity level with the stored information, the controller 130 determines the type of the object drawn by a user according to the object information.

Regarding FIG. 25, an hour hand and a minute hand are created. The controller 130 may determine that a corresponding object is a clock based on the above facts, and create animation effects to move the hour hand and the minute hand.

Regarding FIG. 26, a user may directly draw and store the numbers from 0 to 9. The controller 130 recognizes each number by comparing the objects drawn by a user with the numbers registered in the prestored object library, as described above. Thus, the controller 130 may display the date and the time by combining the numbers from 0 to 9 which a user draws.

Specifically, the controller 130 may determine that each number respectively refers to a year 2610, a month 2620, a date 2630, an hour 2640, a minute 2650, or a second 2660 based on arrangement order, size, and unit of each number. Thus, the controller 130 may create animation effects to modify the time displayed on each item 2610~2660 one by one as the date and the time pass.

Figure 27:
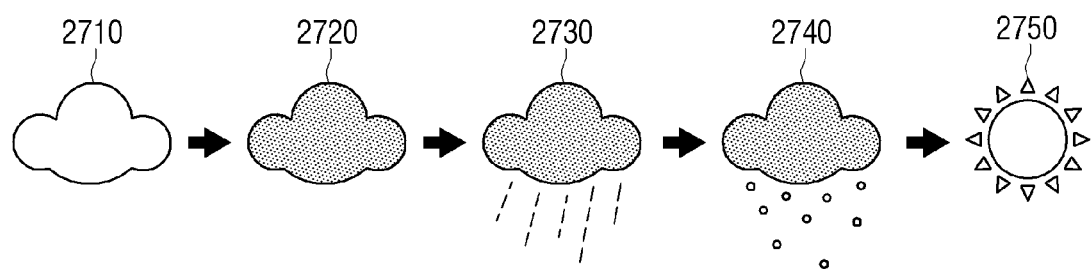
FIGS. 27 to 29 illustrate various examples regarding a method of providing second animation effects as the weather changes.

FIG. 27 illustrates an exemplary embodiment of providing the second animation effects according to the weather changing. Referring to FIG. 27, the controller 130 may gradually monitor changes in the weather, and consecutively display key frames 2710~2750 in various shapes according to the weather, which implement the second animation effects. The key frames 2710~2750 may be drawn by a user as described in FIG. 10, or may be expressed with a plurality of images which are established as default images.

Although FIG. 27 illustrates an exemplary embodiment of providing one animation effect by connecting a plurality of key frames, this is merely exemplary. Accordingly, the implementing of this effect is not necessarily performed according to the above method.

For example, regarding the temperature, animation effects, such as effects showing that a corresponding object emits heat, may be displayed when the temperature rises, and animation effects, such as effects that a corresponding object freezes, may be displayed when the temperature drops. Further, when it rains or snows, animation effects may be provided, with additional objects such as rain or snow displayed on an entire area of the screen or surrounding areas of specific object.

According to an exemplary embodiment, the first animation effects or the second animation effects may be provided through a widget.

Figure 28:
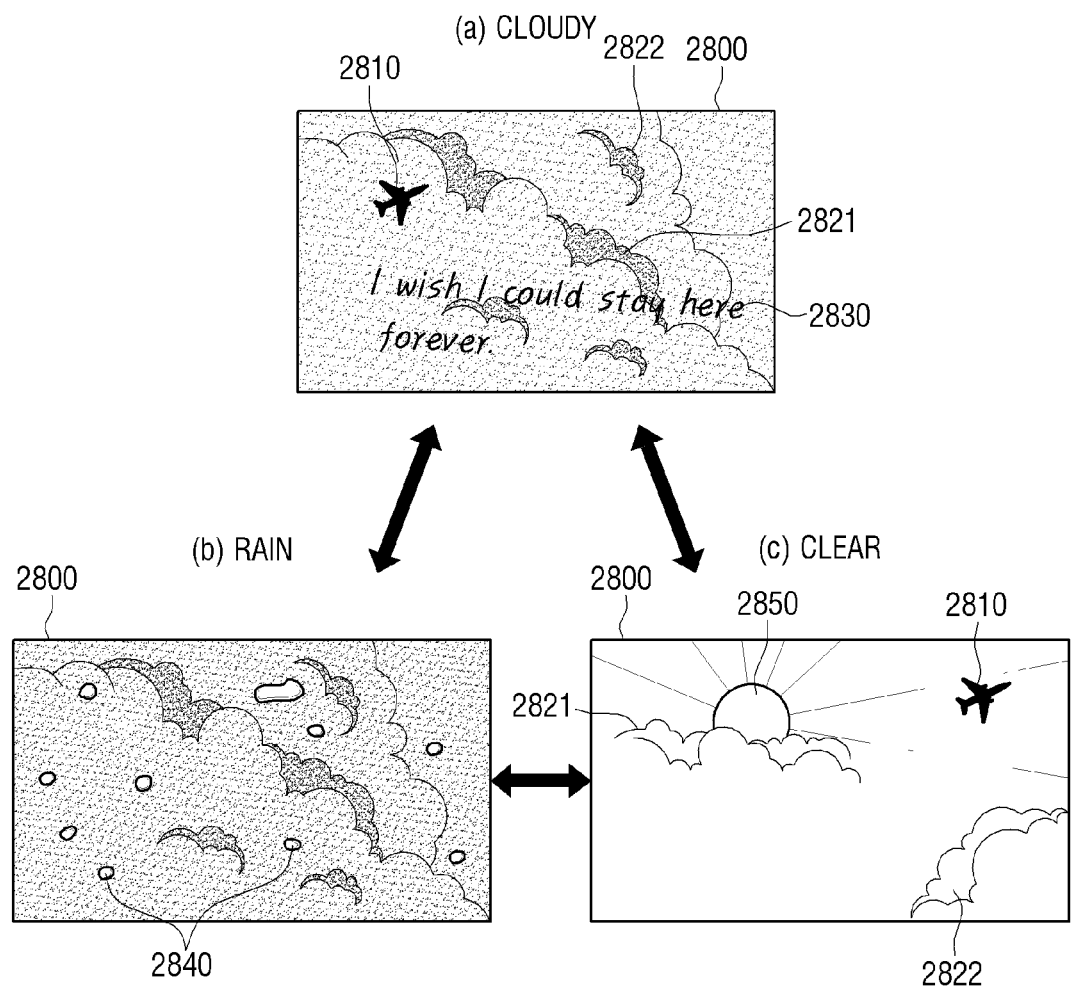

FIG. 28 illustrates an example of the second animation effects provided from the weather widget. Referring to FIG. 28, the controller 130 displays the weather widget 2800 including a sky background directly related to the weather. Specifically, an image viewed when a user looks up at the sky may be included in the weather widget 2800. The weather widget 2800 may be displayed on a part of the home screen or on the entire home screen.

(a) of FIG. 28 illustrates the weather widget 2800 when it is cloudy. The controller 130 may modify the weather widget 2800 according to the sensing results by sensing the weather with an external server or an included sensor. For example, when it is cloudy, as shown in (a) of FIG. 28, the controller 130 may display cloud images 2821, 2822 on the weather widget 2800. During this process, the controller 130 may provide animation effects, such as an effect that the displayed cloud images 2821, 2822 flow with the winds, and an object such as airplane 2810 or bird flies. According to preference or necessity, characters 2830 drawn or selected by a user may be added and displayed on the weather widget 2800. Such characters 2830 may be displayed uniformly or differently with respect to other weather situations.

According to an exemplary embodiment, the controller 130 modifies the widget screen 2800, for example, to show a raindrops falling from the sky when it is determined to rain, as shown in (b) of FIG. 28.

Further, when the rain is determined to stop and the conditions are determined to be clear, the controller 130 modifies the widget screen 2800 to shows the clouds 2821, 2822 lift and the sun 2850 shining, as shown in (c) of FIG. 28.

Further, as the time passes, the airplane 2810 may move its position or disappear from the widget screen 2800.

Although FIG. 28 illustrates that animation effects are automatically provided according to the weather situations, the background of the widget screen 2800 may be fixedly displayed according to another exemplary embodiment. In this case, the controller 130 may be implemented to provide the above described animation effects when various user manipulations such as hovering and gazing are sensed.

According to an exemplary embodiment, the widget may be created to be used for displaying various types of information, such as, for example, the time, the weather, and the calendar. According to another exemplary embodiment, the controller 130 may create a unified widget by combining a plurality of objects.

Figure 29:
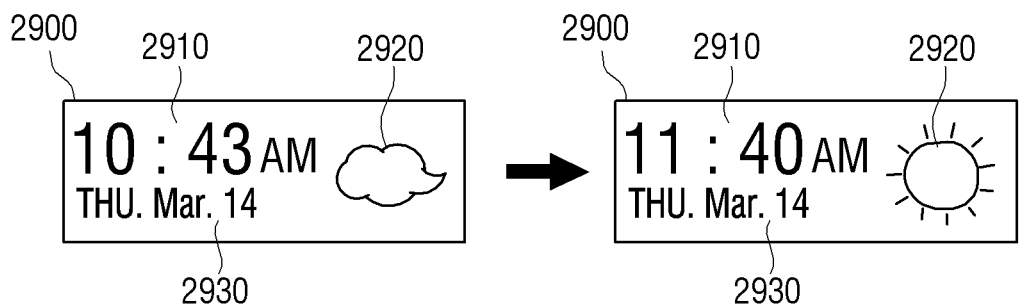

FIG. 29 is a diagram provided to explain an example of displaying the unified widget. Specifically, FIG. 29 illustrates an example of the unified widget 2900 indicating the time 2910, the date 2920, and the weather 2930.

When the time passes, or the weather and the date change, the controller 130 may provide animation effects to properly modify corresponding objects 2910, 2920, and 2930 within the unified widget 2900. In FIG. 29, animation effects are displayed when the time changes to 11 hours 40 minutes and the weather gets clear.

Similar to FIG. 28, the exemplary embodiment of FIG. 29 may provide animation effects to modify the unified widget 2900 by automatically recognizing changes in the weather, the time and the date, or may provide animation effects when an event which a user performs such as, for example, hovering or gazing, occurs.

According to an exemplary embodiment, each object included in the unified widget 2900 may be directly drawn by a user. The controller 130 may create the unified widget by combining the objects drawn by a user as appropriate to the situation. Relevant exemplary embodiments will be specifically described below.

In summary, the first animation effects and the second animation effects may be provided through the screen or the widget. Further, such animation effects may be combined with each other and provided simultaneously.

Figure 30:
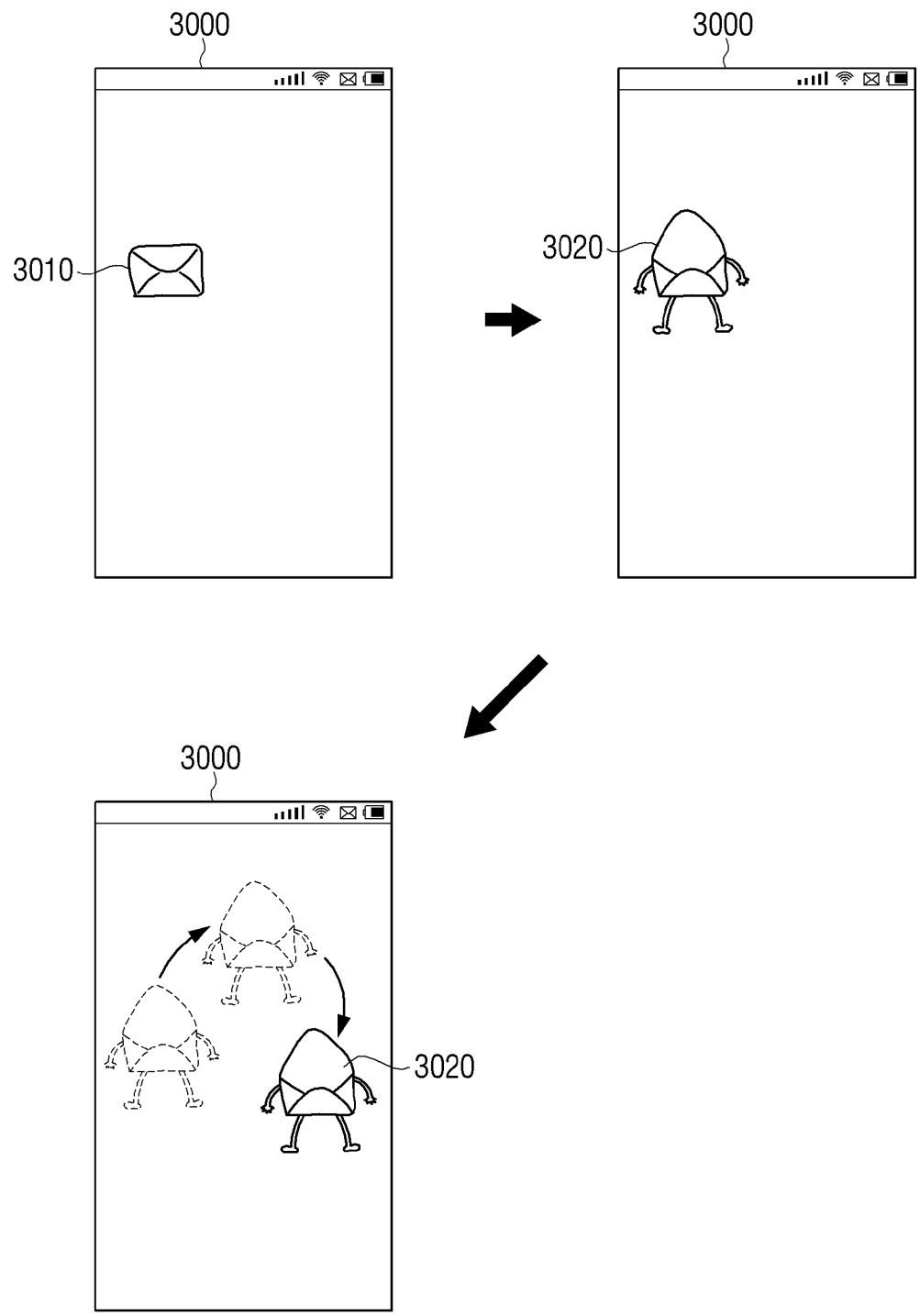
FIG. 30 illustrates an example regarding a method of providing third animation effects as a new message arrives.

FIG. 30 illustrates an exemplary embodiment of providing the third animation effects according to the system changing. FIG. 30 illustrates a screen 3000 including an object 3010 matching the word program. The object 3010 is usually displayed as being drawn by a user; when a new text message arrives, the object 3010 may be modified in a shape 3020 indicating that the text message has arrived, and moved to another position within the screen 3000. The controller 130 may gradually move its position until a user touches a corresponding object 3020.

Figure 31:
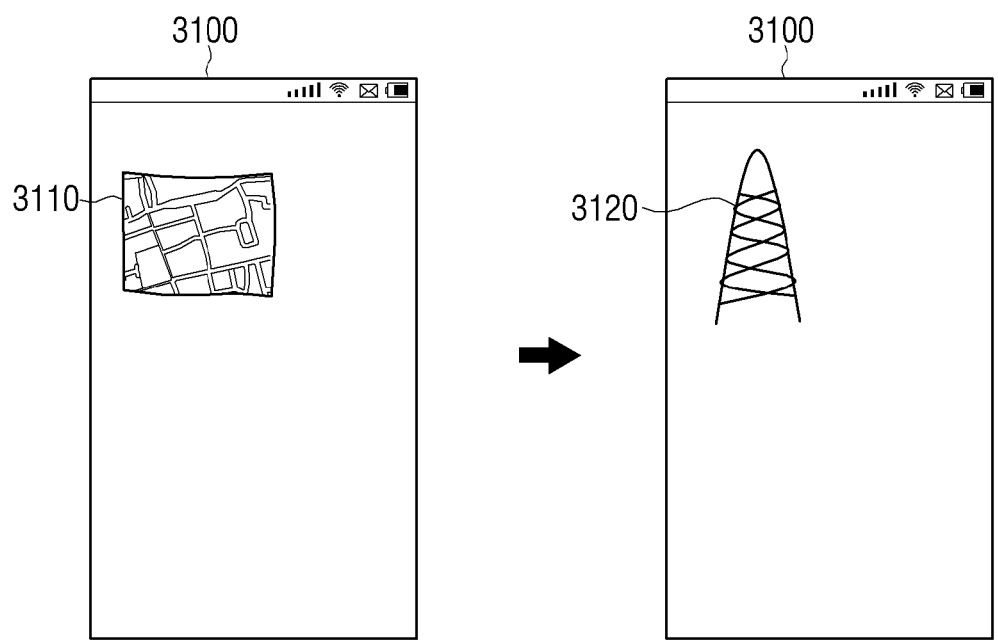
FIG. 31 illustrates an example regarding a method of providing fourth animation effects as the position changes.

FIG. 31 illustrates an exemplary embodiment of providing the fourth animation effects according to the position of the user terminal device.

Referring to FIG. 31, the user terminal device 100 may display a screen 3100 including an object 3110 matching the navigation program or the map. During this process, when the user terminal device 100 moves to a specific place, the controller 130 may modify and display the object 3110 in a corresponding shape to the point where the user terminal device 100 moves. FIG. 31 illustrates that the controller 130 modifies and displays the object 3110 into a tower 3120 because a user moves near to the tower.

Additionally, animation effects which expand or reduce the size of the object may be provided.

As described above, in addition to the case that user manipulation is performed on the user terminal device, when the device changes or the surrounding situation changes, various types of animation effects may be provided. Such animation effects may be provided by using objects drawn by a user. The following will specifically explain a method by which a user creates objects provided with animation effects.

Providing Animation Effects with Objects Drawn by User

Figure 32:
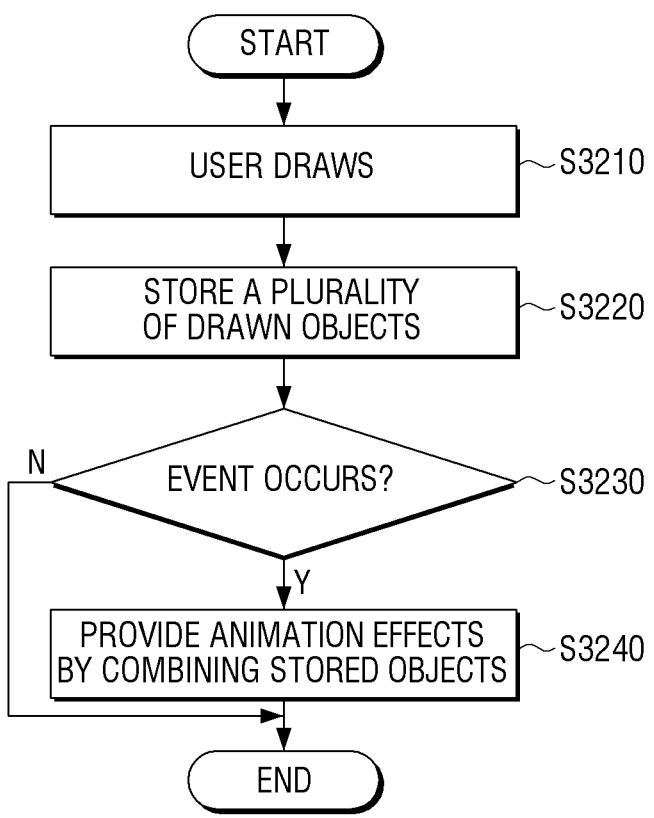
FIG. 32 is a flowchart provided to explain an exemplary embodiment of creating animation effects by combining various objects which a user draws.

FIG. 32 is a flowchart provided to explain a method of providing animation effects according to an exemplary embodiment. Referring to FIG. 32, when a user draws a plurality of objects at operation S3210, the drawn objects are stored at operation S3220.

When an event to be provided with animation effects occurs at operation S3230, the controller 130 provides animation effects by selectively combining the stored objects at operation S3240. Specifically, the controller 130 may create the unified widget by selectively combining objects among the objects drawn and stored by a user, or provide video animation effects by selecting only the objects and using the objects as key frames.

Similar to FIG. 23, the exemplary embodiment of FIG. 32 may be performed in the user terminal device including the display 110, the sensor 120, the controller 130, the storage 140, and the receiver (not illustrated). The receiver may also be referred to as a communicator or communication interface. The storage 140 may store a plurality of objects created by a user's drawing manipulation.

While the display 110 is displaying the widget, when situation information is received, the controller 130 may update the widget by combining at least parts among a plurality of objects according to the situation information.

Figure 33:
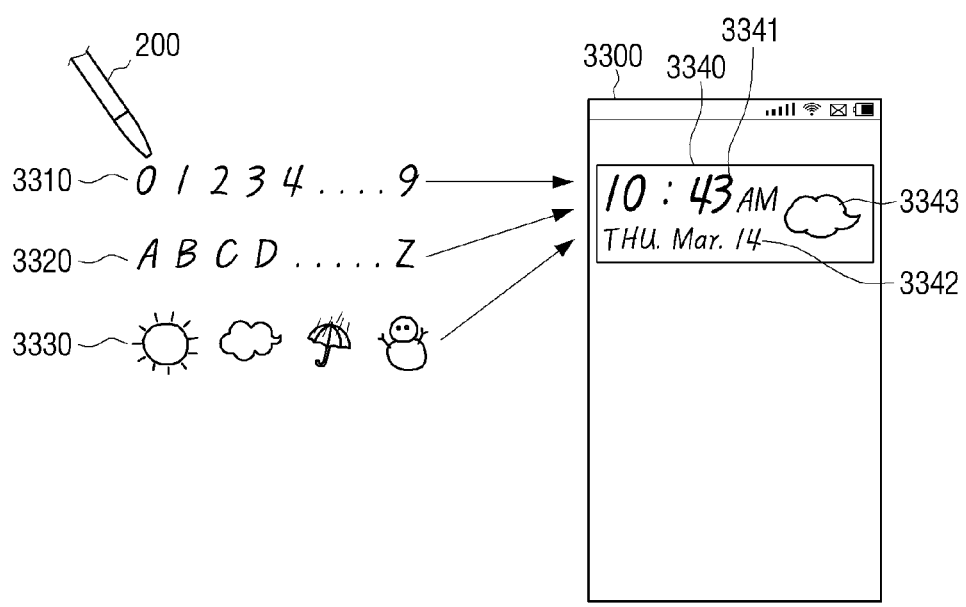
FIGS. 33 and 34 illustrate various examples of animation effects according to the exemplary embodiment of FIG. 32.

FIG. 33 is a diagram provided to explain a method of providing animation effects according to the exemplary embodiment of FIG. 32. Referring to FIG. 33, a user may draw various objects 3310, 3320, 3330 by using the pen 200. When the pen drawing manipulation of a user is sensed on the screen by the sensor 120, the controller 130 stores the objects 3310, 3320, 3330 drawn on the screen by the pen drawing manipulation in the storage 140.

Although FIG. 33 illustrates the exemplary embodiment of drawing the numbers 3310, the characters 3320, and the images 3330, various signs may be additionally drawn. Regarding the numbers 3310, when a user respectively draws the numbers from 0 to 9, the controller 130 may express every number by combining these numbers. Further, regarding the characters 3320 such as letters of the alphabet, when a user draws all the letters from A to Z, the controller 130 may express every English word. It is understood that alphabets of languages other than English may also be used. Further, when a user draws various images 3330 indicating the weather, the controller 130 may express the weather by using each of the images.

Thus, the controller 130 may create the unified widget 3340 by combining signs, numbers and characters based on current situations such as current time, current weather, and current date information. FIG. 33 illustrates that the current time is 10:43 a.m., the current date is Thursday, March 14th, and the current weather is cloudy. Therefore, the controller 130 expresses current time 3341 and current weather 3342 by using the numbers 0, 1, 4, 3 and the characters, A, H, M, U, R, T among the objects drawn by a user. Further, image 3343 may be displayed as appropriate for the current weather within the unified widget 3340.

As a result, even when a user does not input every word, weather or time, the controller 130 may create the unified widget 3340 by combining the objects properly according to the situation. The created widget 3340 may be displayed on parts of the screen 3300 or the entire screen 3300.

When a user performs hovering or gazing, or when a situation such as the weather, the time, or the date changes, the controller 130 may update the unified widget 3340 by re-combining numbers, words, and images.

According to an exemplary embodiment, the objects such as numbers, words, images, and signs may be used on icons or widgets to express various types of information in addition to the weather, the date, and the time. For example, regarding the calendar widget, when a user draws words, e.g., Monday, Tuesday, Wednesday, Thursday, Friday, Saturday, and Sunday, and draws numbers from 0 to 9, the controller 130 may create the calendar widget by combining the drawn number and words. Additionally, the objects may be used in the clock widget, the address book information, or the other various applications. Thus, a user may use the drawn objects as new fonts. It is understood that other symbols, e.g., mathematical symbols, cultural symbols, etc., may also be drawn by the user.

Figure 34:
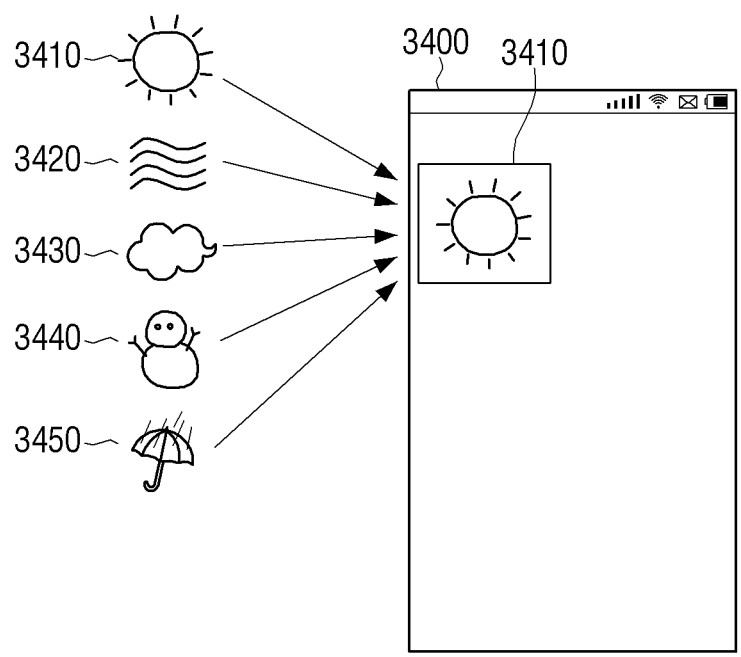

FIG. 34 illustrates an example of the second animation effects provided according to the changing weather. Referring to FIG. 34, the controller 130 displays an object 3410 corresponding to current weather on a specific position of screen 3400 among a plurality of objects 3410~3450 drawn and stored by a user. When the weather changes, the controller 130 modifies the previous object 3410 into a new object corresponding to the weather changing. For example, when the weather gets foggy after being clear, the first object 3410 is modified to the second object 3420. Meanwhile, when the weather gets cloudy and rains after being clear, the second animation effects may be provided to consecutively display the first object 3410, the second object 3420, and the third object 3430.

As described above, various animation effects may be provided according to various events. A user may directly create data to provide animation effects, e.g., animation data. The following will specifically explain various methods of creating animation data.

Various Exemplary Embodiments of Creating Animation Data

Figure 35:
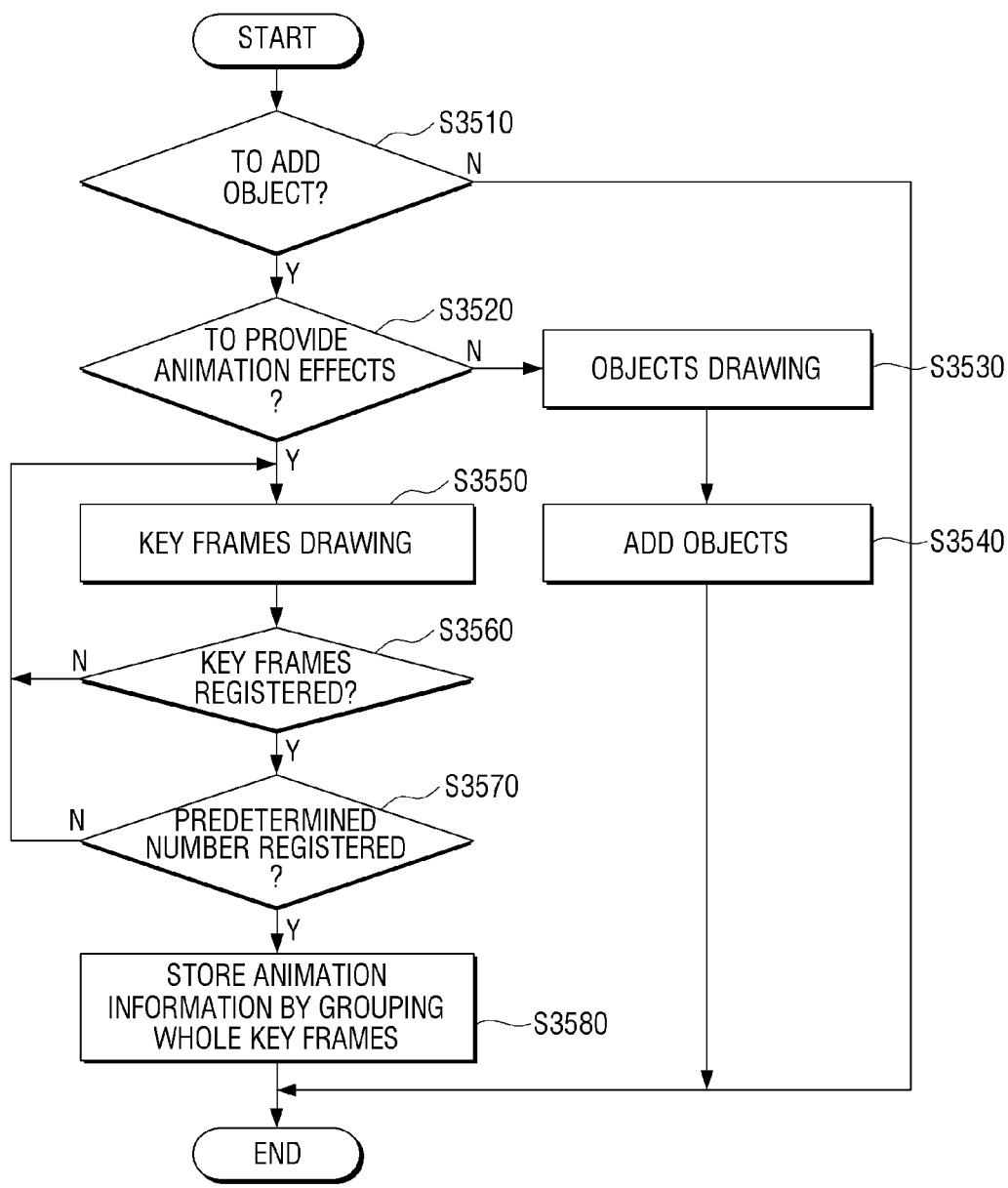
FIG. 35 is a flowchart provided to explain a method of creating key frames.

FIG. 35 is a flowchart provided to explain an example regarding a method of creating animation data. Referring to FIG. 35, when a user inputs a command to add objects at operation S3510, the controller 130 may determine whether animation effects are provided at operation S3520. A determination as to whether to provide animation effects may be made according to user selection. Specifically, when a user selects a menu to provide animation effects, the controller 130 may determine that a user is trying to create animation data.

When a user is trying to provide animation effects, he or she may draw a key frame at operation S3550. The term 'key frame' may refer to one of the plural frames which collectively constitutes an animation. Thus, when a plurality of still frames is consecutively displayed, it may seem like an object is moving because of the afterimage effects. To obtain such afterimage effects, a user may create an animation by drawing a plurality of key frames related to each other.

After one key frame is drawn at S3550, when the key frame is registered at operation S3560, the controller 130 confirms whether the preset number of frames are registered at operation S3570. Thus, the user terminal device 100 may previously establish the minimum number of key frames to create one animation. When the number of key frames is less than the established number, the controller 130 provides an opportunity for a user to draws another key frame. Thus, a user may draw another key frame at operation S3550. Therefore, when the established number of key frames is registered, the controller 130 groups the registered key frames, creates one animation, and stores the animation information at operation S3580.

Meanwhile, when a user does not provide animation effects, when a user draws an object at operation S3530, the controller 130 adds the object on the screen at operation S3540. In this case, when the control operation is matching a corresponding object, the controller 130 may match and store the object information with the control operation information.

Figure 36:
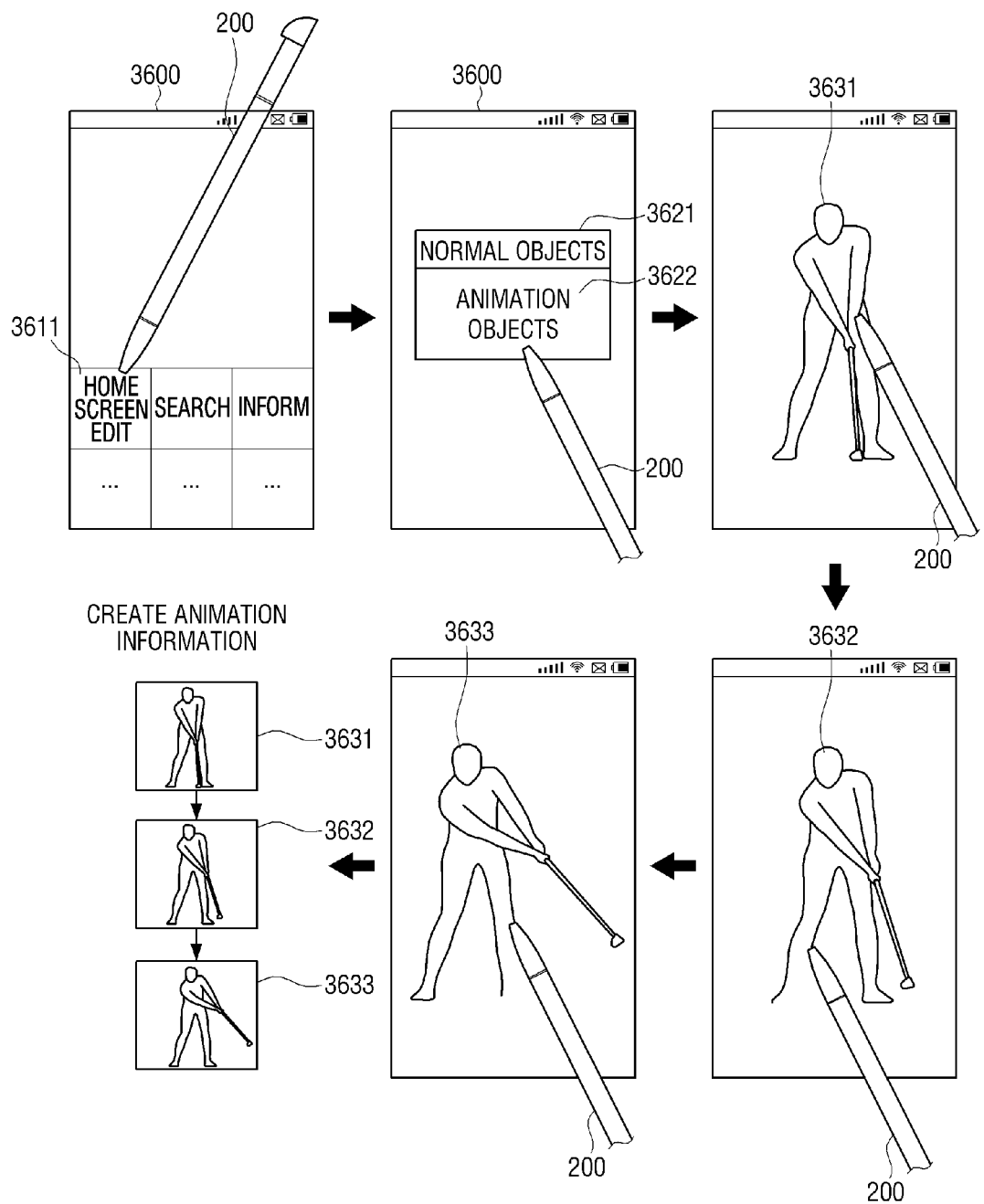
FIGS. 36 and 37 are provided to explain a process of creating key frames.

FIG. 36 is a diagram provided to explain an example regarding a process of creating animation data. Referring to FIG. 36, when a user inputs a selection into a menu confirming a command while screen 3600 is displayed, the controller 130 displays a plurality of menus including screen editing menu 3611 within the screen 3600.

When a user selects the screen editing menu 3611, the controller 130 displays menus 3621, 3622 to determine features of the object. Thus, the menu 3621 may be displayed to draw a normal object and the menu 3622 may be displayed to draw an animation object. When a user selects the animation object menu 3622, the controller 130 deletes a plurality of menus on the screen 3600 and stands by for the drawing.

After drawing a first key frame 3631, a user then draws at least one additional key frame, for example, the user consecutively draws a second key frame 3632 and a third key frame 3633. A user may input a specific button whenever one key frame is completed, or register a corresponding key frame by waiting for a preset time.

After registering the completed key frames, when a specific event occurs, the controller 130 may consecutively display the key frames 3631~3633 registered by a user to provide animation effects.

Although not illustrated in FIG. 36, an OSD (on screen display) message informing a status of the registration may be displayed on the screen whenever each key frame is registered.

If a user determines that a proper number of key frames are drawn, he or she may finish the key frame drawing. Further, when the total number of key frames is already established, the controller 130 may automatically finish the key frame drawing when the total number of key frames is registered. Further, when a user selects a specific button or a specific menu after drawing a number of key frames that he or she wants, the key frame drawing may be finished. Such a detailed process may be implemented in different ways according to different exemplary embodiments.

Meanwhile, without manipulating another menu, a user may establish animation effects after consecutively drawing a plurality of objects on the screen.

Figure 37:
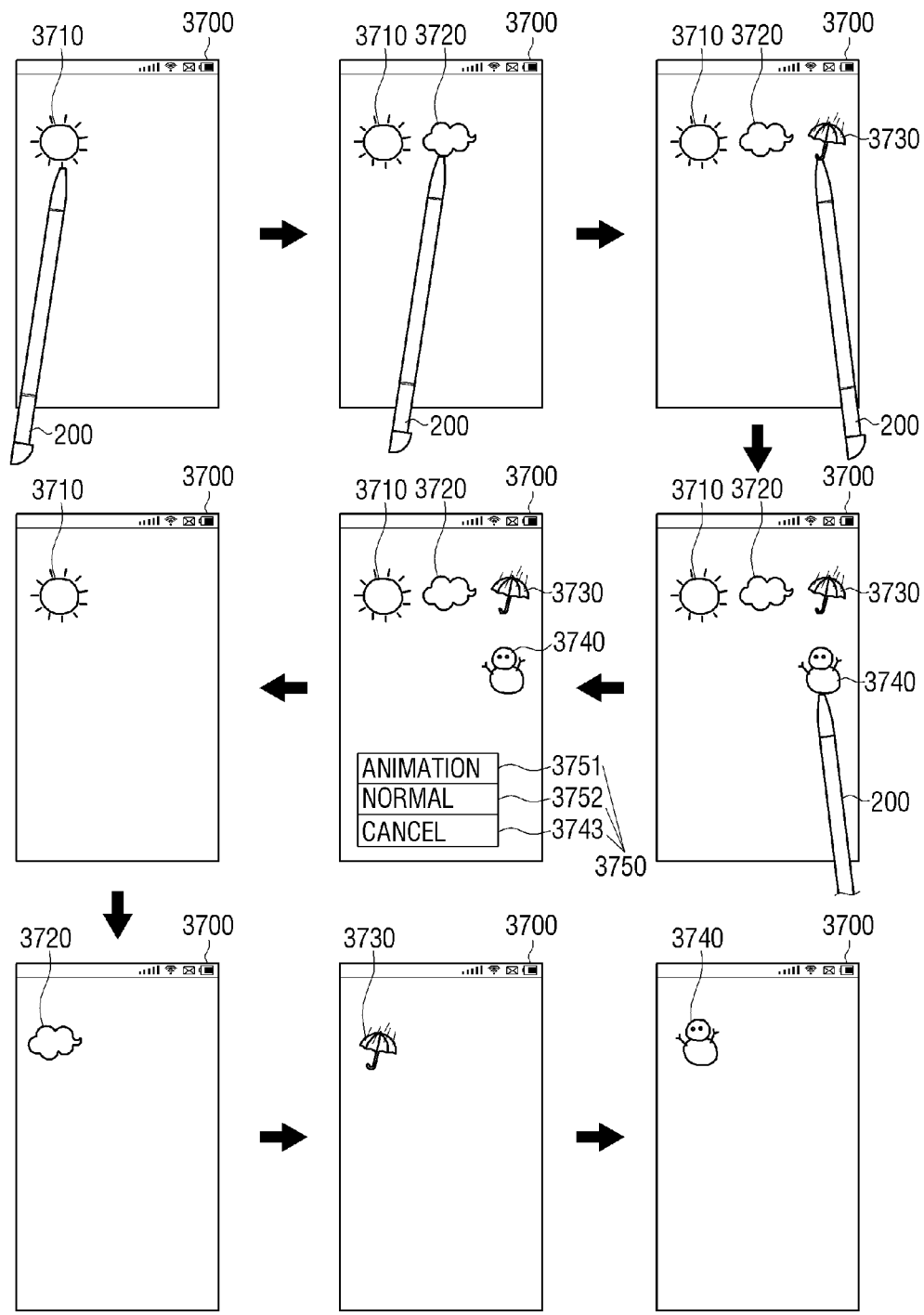

FIG. 37 is a diagram provided to explain a method of creating animation objects in the user terminal device according to an exemplary embodiment. Referring to FIG. 37, a user may consecutively draw a plurality of objects 3710~3740 by using the input device such as a pen 200 on screen 3700. When a user pushes a specific menu after drawing all of the objects 3710~3740 or when a preset number of objects are drawn, the controller 130 may display menu 3750 to select features.

When an animation menu 3751 is selected among menus 3751, 3752, and 3753, the controller 130 creates an animation object by grouping all of the objects 3710~3740 drawn by a user. On a position where the object 3710 is initially drawn, the controller 130 may provide animation effects by consecutively modifying each of the objects 3710~3740 or modifying the objects according to an order corresponding to surrounding situation changes.

According to another exemplary embodiment, a user may select and match the previously created animation effects with the objects instead of drawing key frames. In this case, when a user directly draws the shapes of objects or first selects a control operation, the controller 130 may suggest proper animation effects based on the objects or the control operation.

Figure 38:
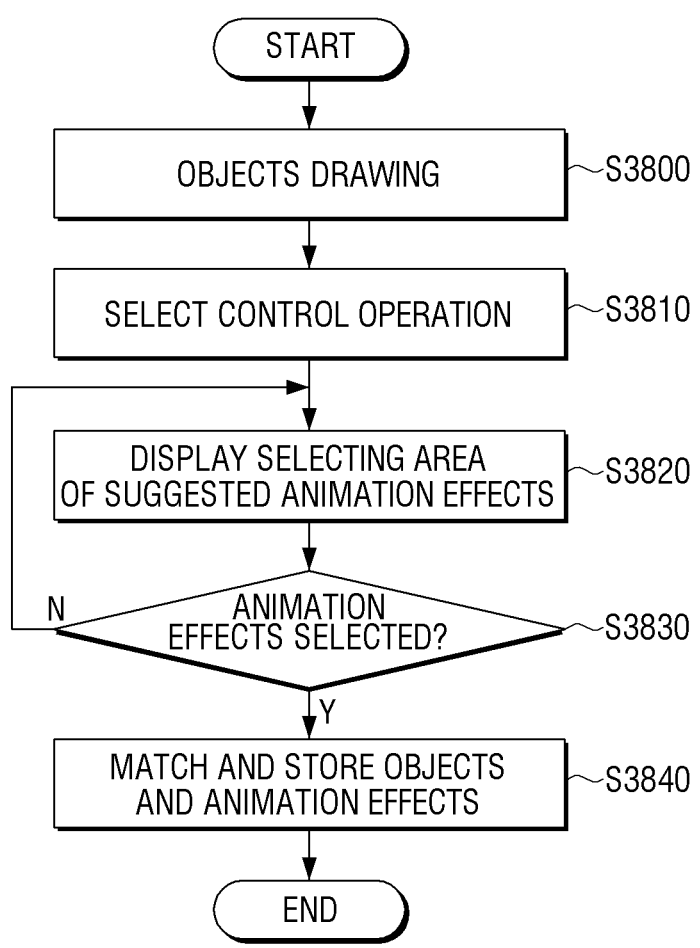
FIG. 38 is a flowchart provided to explain a method of generating animation data.

FIG. 38 is a flowchart provided to explain a method of creating objects according to an exemplary embodiment. Referring to FIG. 38, a user may draw objects on the screen of the user terminal device 100 at operation S3800. Further, a user may select the control operation matching the objects at operation S3810.

When the control operation matching the objects is selected, the controller 130 determines the recommended animation effects based on the shapes of the objects or the selected control operation. Further, a selecting area, which is an area where the recommended animation effects can be selected, may be displayed at operation S3820.

When a user selects one or more animation effects within the selecting area, the controller 130 stores the selected animation effects, corresponding objects, and the control operation to be matching the selected animation effects and corresponding objects in the storage 140 at operation S3840.

FIG. 38 illustrates that the recommended animation effects are provided when a user directly draws objects and matches a control operation with the drawn objects; however, the recommended animation effects may be provided when normal icons, images, and characters which a user does not draw are selected. Relevant exemplary embodiments will not be separately illustrated and described herein.

Figure 39:
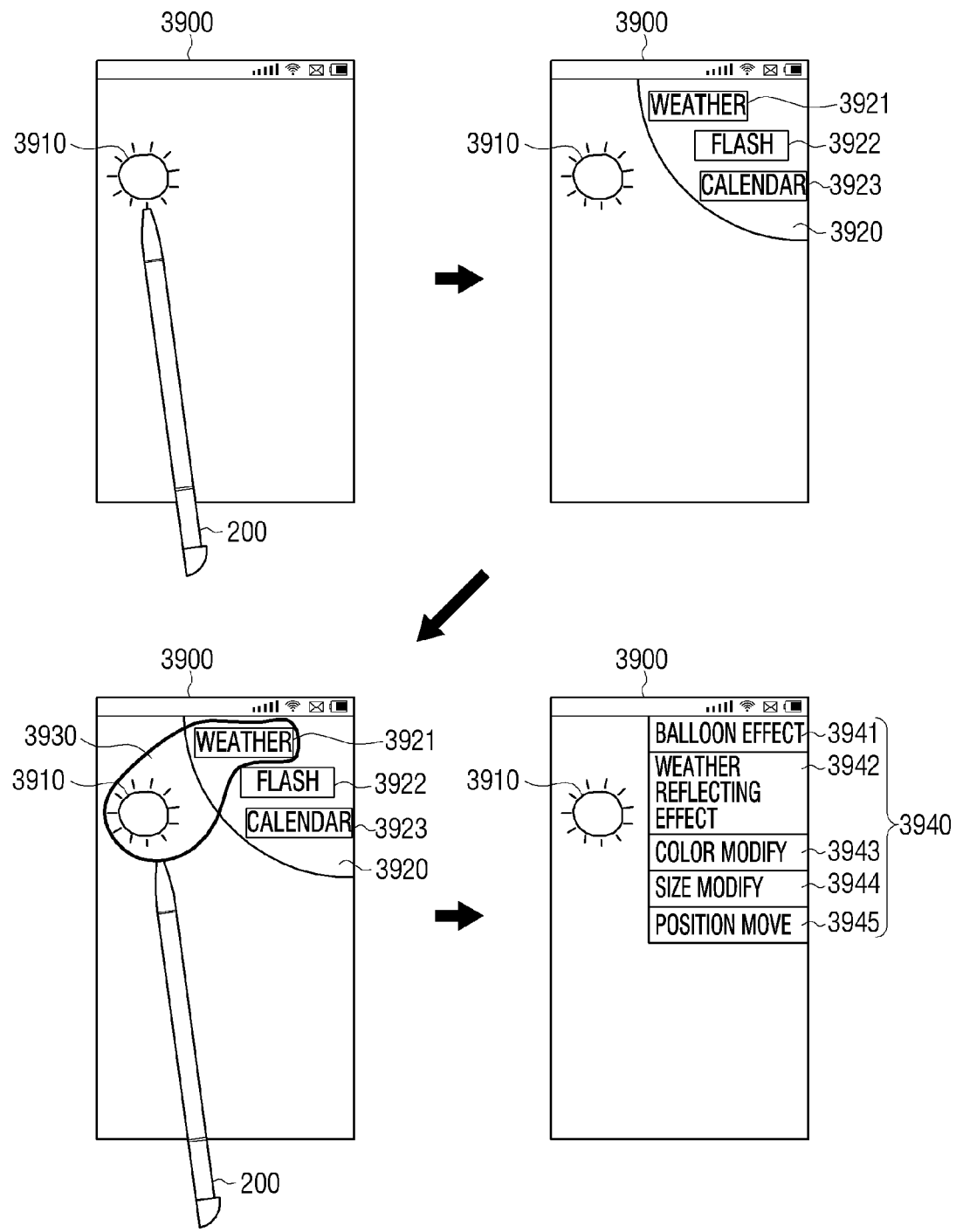
FIG. 39 is a diagram provided to explain a process of generating animation data.

FIG. 39 is a diagram provided to explain a process of creating animation objects by selecting the recommended animation effects. Referring to FIG. 39, when a user draws one object 3910 on screen 3900, the controller 130 displays a selecting area 3920 where control operations 3921, 3922, 3923 can be selected. During this process, a user may select the control operation with a manipulation such as by drawing closed curve 3930 to bind the object 3910 with the control operation 3921 or by touching the control operation 3921 within the selecting area 3920.

When the control operation is selected, the controller 130 determines the recommended animation effects by considering the type of the control operation and the shapes of the objects, and displays selecting area 3940 where the recommended animation effects can be selected.

FIG. 39 provides various examples of recommended animation effects, including balloon effects 3941 which cause the object 3910 to blow up and burst considering that the object 3910 has a circle shape, and weather reflecting effects 3942 which cause the shape of the object 3910 to be modified according to the weather considering that the selected control operation is weather application. Additionally, animation effects 3943, 3944, 3945 which are frequently used by a user are suggested. It is understood that many different combinations of recommended animation effects other than those shown in FIG. 39 may be used according to other exemplary embodiments.

Accordingly, the controller 130 may suggest animation effects according to various conditions. When a user selects one of the suggested effects within the selecting area 3940, the controller 130 creates animation objects by applying the selected effects.

According to an exemplary embodiment, a user may create normal objects as well as animation objects. For example, a user may create objects first, and establish features of the created objects to be animation or normal, as described above. Further, a user may match the control operation that he or she requests regarding normal objects or animation objects.

A user may select and match the control operation after the user draws the objects, or draw and match the objects after selecting the control operation.

Regarding the exemplary embodiment of drawing objects first, a user may draw various objects with various input devices, such as a finger or pen 200, by using the screen like a canvass.

After the objects are drawn, a user may select the control operation matching the objects. When a user command to match the control operation is inputted, the controller 130 displays a list of the applications installed in the user terminal device 100 per object. A user may select an application matching each object on the application list. When the user finishes selecting the applications matching the objects, the controller 130 may match information regarding a corresponding object with information regarding the selected application and store the matched information in the storage 140 or other storing device, e.g., a remote server. Accordingly, a user creative screen may be created.

Further, the control operation may be selected before drawing objects, and objects may be drawn thereafter. In this case, the controller 130 may determine the recommended animation effects as described in FIG. 39, and may display a screen enabling a user can to the animation effects.

Further, a user may directly draw and store the screen itself that can include normal objects or animation objects. The method of creating such a screen will be not be specifically illustrated and explained.

According to an exemplary embodiment, when a user manipulates the screen by using the pen 200 as well as his or her fingers, types of events to be provided with animation effects and types of the animation effects may be variously implemented. Thus, the user terminal device may distinguish whether the manipulation is performed with the user's body (e.g., fingers) or the pen 200, and perform different control operations according to the results of the distinguishing. The following explanation will specifically explain various exemplary embodiments of a detailed constitution regarding the user terminal device.

Detailed Constitution of User Terminal Device

Figure 40:
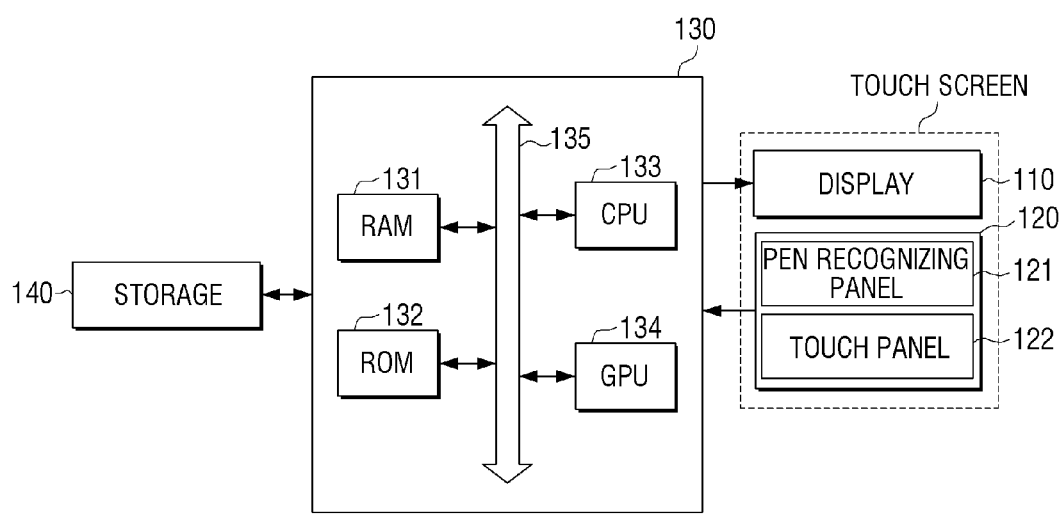
FIG. 40 is a block diagram of a user terminal device which is pen-controllable.

FIG. 40 illustrates an example of a detailed constitution regarding the user terminal device configured to be used with the pen 200. Referring to FIG. 40, the user terminal device 100 may distinguish and sense a user finger from the pen. The user terminal device 100 of FIG. 40 includes the display 110, the sensor 120, the controller 130 and the storage 140.

The display 110 displays various screens as described above. The display 110 may be implemented to be various types of displays such as a liquid crystal display (LCD), an organic light emitting diode (OLED) display, and a plasma display panel (PDP). Within the display 110, driving circuits that can be implemented which may be, for example, a-si TFT, low temperature poly silicon (LTPS), TFT, and organic TFT (OTFT), and a backlight unit may be included together.

FIG. 40 illustrates that the display 110 and the sensor 120 are implemented to be one touch screen. The sensor 120 may include a pen recognizing panel 121 and a touch panel 122. The pen recognizing panel 121 senses the pen 200 when the pen approaches or touches the sensor 120, and outputs event signals according to the sensing results. Such a pen recognizing panel 121 may be implemented with an EMR method, and may sense an actual touch or an approaching input from the pen 200 according to intensity changes of the electromagnetic field by the approaching or touching pen 200.

Specifically, the pen recognizing panel 121 may include an electrical induction coil sensor (not illustrated) and electrical signal processing circuits (not illustrated). The electrical induction coil sensor is formed in a grid structure which a plurality of loop coils which are arranged to cross with each other. The electrical signal processing circuits provide alternate current signals consecutively to each loop coil of the electrical induction coil sensor, and transmit the outputted signals from each loop coil to the controller 130.

When the pen 200 including resonating circuits is placed near to the loop coils of the pen recognizing panel 121, a magnetic system transmitted from a corresponding loop coil generates electrical currents based on mutual electrical induction on the resonating circuits within the pen 200. Based on the generated electrical currents, an induced magnetic system may be generated from the coils constituting the resonating circuits within the pen, and the pen recognizing panel 121 senses an approaching position of the pen 200 or a touch position of the pen 200 by examining the induced magnetic system on the loop coils in situations receiving signals.

The above description describes the pen 200 as an example of an input device; however, other objects that can generate electrical currents based on electrical induction may also be used as input devices. The pen recognizing panel 121 may be arranged on a lower side of the display 110 and activated according to an occurrence of a specific event or by default conditions.

The touch panel 122 senses a physical touch input through the user body or other objects. The touch panel 122 may be implemented to include, for example, a touch film, a touch sheet, and touch pad, for example. The touch panel 122 outputs touch event values corresponding to the sensed point when the touch is sensed. The touch panel 122 may include various types of touch sensors such as a capacitive charging type or a compressive type.

For example, when the touch panel 122 is implemented to be a capacitive charging type, the touch panel 122 is constituted by coating thin metal conductive materials (e.g., an Indium Tin Oxide substrate (ITO)) on both sides of glass so that electrical currents can flow on the surface of the glass, and is coated with conductive materials that can store electrical charges. When the surface of such a touch panel 122 is touched, a certain amount of electrical charges move to the touch position because of the electrostatics, and the touch panel 122 senses the touched point by recognizing a changing amount of electrical current according to movement of electrical charges, and tracks the touching event. According to an exemplary embodiment, the touching event performed on the touch panel 122 may be generated by a human finger, or may be generated by another object that can causes changes in electrostatic charges, e.g., a conductive material type object that can change electrostatic charges.

Although FIG. 40 illustrates that the pen recognizing panel 121 and the touch panel 122 may be provided separately, the two panels may be implemented together as one panel. Accordingly, the sensor 120 may respectively distinguish and sense touching and approaching manipulations of the user's finger from touching and approaching manipulations of the pen 200. The controller 130 may perform various control operations according to the sensing results.

Although not illustrated in FIG. 40, the user terminal device 100 may further include a driver (not illustrated) and a frame buffer (not illustrated) that can drive the display. The frame buffer buffers image frames to be displayed on the panel of the display 110, and the driver converts the image frames stored in the frame buffer into image source signals, provides the image source signals to the display 110, and drives the display 110 to display the image frames.

The storage 140 may store various programs and data requested for the operation of the user terminal device 100. Specifically, the storage 140 may store programs and data to create various screens and animation data. Further, when the home screen is directly drawn, various data related to the drawn home screen may be stored.

When a preset event occurs, the controller 130 provides various animation effects by using the programs and data stored in the storage 140. Because types of events and animation effects thereof are specifically explained in the above various exemplary embodiments, the types of events and animation effects will not be further explained.

Further, when a user directly draws key frames or establishes animation effects, the controller 130 may create animation data according to the drawn key frames or the established animation effects by a user and store the animation data or animation effects in the storage 140.

Further, when a modification of the key frames or animation effects is performed, the controller 130 may update the animation data stored in the storage 140, or may modify the control operation matching the object according to a user's intention.

The controller 130 controls a general operation of the user terminal device by using the various programs and data stored in the storage 140. The controller 130 includes RAM 131, ROM 132, CPU 133, GPU (Graphic Processing Unit) 134, and a bus 135. RAM 131, ROM 132, CPU 133, and GPU 134 may connect with each other through the bus 135. CPU 133 performs booting by accessing the storage 140 and using the stored O/S in the storage 140. Further, CPU 133 performs various operations by using various programs, contents and data stored in the storage 140.

ROM 132 stores a set of commands to boot the system. When a turn-on command is inputted and an electrical source is provided, CPU 133 copies the stored O/S in the storage 140 to RAM 131 according to the stored commands in ROM 132, implements the O/S, and boots the system.

When booting completes, CPU 133 copies the various programs stored in the storage 140 to RAM 131, implements the copied programs to RAM 131, and performs various operations. GPU 134 displays the home screen when the booting of the user terminal device 100 is completed. Specifically, GPU 134 may create the home screen including various objects such as icons, images and characters by using a calculator (not illustrated) and a renderer (not illustrated). The calculator calculates feature values such as a shape of coordinate values, and a size and color in which each object is displayed according to the layout of the screen. The renderer creates screens in various layouts including objects based on the feature values calculated in the calculator. The screens created in the renderer are provided to the display 110 and displayed within display area.

GPU 134 may render various screens by using the programs and data stored in the storage 140. Further, GPU 134 renders objects according to manipulation when a user touches or approaches the screen with the user's finger or the pen 200. For example, when a user draws a circle with the pen 200, a circle is displayed according to the drawing tracks. Therefore, a user may confirm the key frames that he or she is drawing with his or her eyes.

GPU 134 may express screens and objects on different graphic layers with each other. Thus, the graphic layers may overlap and express the object layers on the upper layers of the screen layers. GPU 134 may distinguish the finger manipulating from the pen manipulating, and express different graphic lines from each other. For example, regarding the finger manipulating, because the end of a user's finger is blunt compared to the end of a pen, GPU 134 may express thick graphic lines in response to input from a user's figner. Regarding the pen manipulating, the GPU 134 may express sharp graphic lines.

The controller 130 may examine boundary lines of the rendered objects on the object layers, and recognize the objects according to the boundary lines. Accordingly, the controller 130 may recognize various key frames drawn by a user, calculate pixel coordinate values to designate the recognized points, and store the pixel values as key frame information or object information on the storage 140.

As explained in FIG. 40, when the user manipulation with the pen is recognized, various user manipulations including object drawing may be implemented in various shapes. For example, when a user draws sharp lines with the pen 200 and rubs the lines with his or her finger, the controller 130 may express the previously sharp drawn lines as being blurred. Further, a user may modify the tool applied to the pen 200 with the other hand which is not holding the pen 200 while he or she draws an object with the pen 200. Thus, while drawing with the pencil by selecting the pencil features regarding the pen 200, when a user touches the screen with the other hand, the line drawn with the pencil may be modified to be thicker or thinner, or to be other features such as pen or pastel instead of the pencil. When being modified to include eraser features, points in the object touched with the pen may be erased.

As described above, the controller 130 may provide various drawing functions according to user input and inputting methods. As a result, a user may create animation data by drawing various key frames or objects according to his or her intentions and characters.

The following explanation will specifically explain a technique of sensing manipulation with various input devices, like the user's finger or the pen 200.

Figure 41:
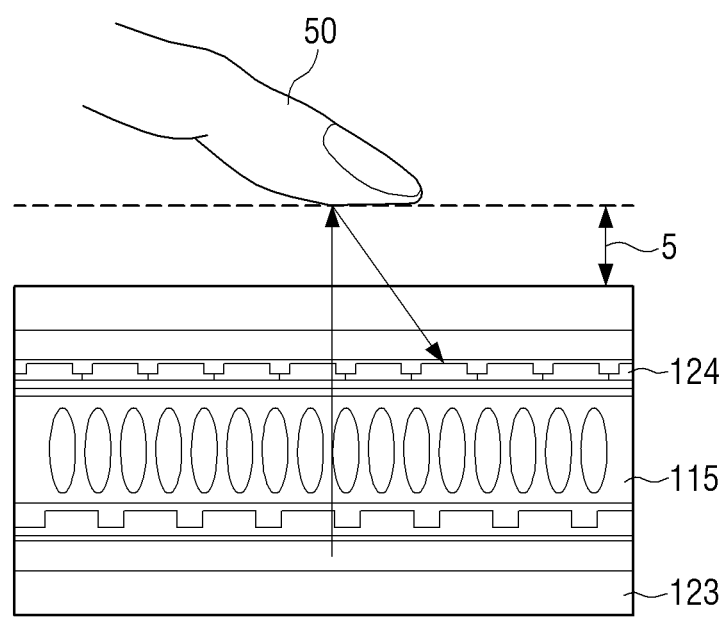
FIGS. 41 and 42 are provided to explain a method of sensing user manipulation with various inputs.

FIG. 41 is a diagram provided to explain a method of sensing an approaching manipulation of the user's finger by using an approaching sensor. Referring to FIG. 41, the sensor 120 may further include an infrared source 123 and an infrared sensor 124. The infrared source 123 and the infrared sensor 124 may perform the functions of a sensor configured to sense an approaching input of a user.

Specifically, the infrared source 123 is installed on one surface of a display panel 115 within the display 110, and the infrared sensor 124 is installed on another surface of the display panel 115. The infrared source 123 emits infrared rays toward a surface direction of the display panel 115. Accordingly, there is an area where the approaching user finger 50 can be recognized on the surface of the display panel 115. This area becomes an available recognized area 5 where the approaching touch can be recognized.

The infrared sensor 124 may include a plurality of infrared sensing components which are arranged in an array format. Thus, when the finger approaches within the available recognized area 5, the infrared sensor 124 may create infrared scan images by sensing infrared rays reflecting from the finger 50. The user terminal device 100 may sense an approaching touch input by using the created infrared scan images.

Meanwhile, the sensor 120 may sense the approaching pen 200. As described above, the pen recognizing panel 121 may include the electrical induction coil sensor and the electrical signal processing circuits (not illustrated).

Figure 42:
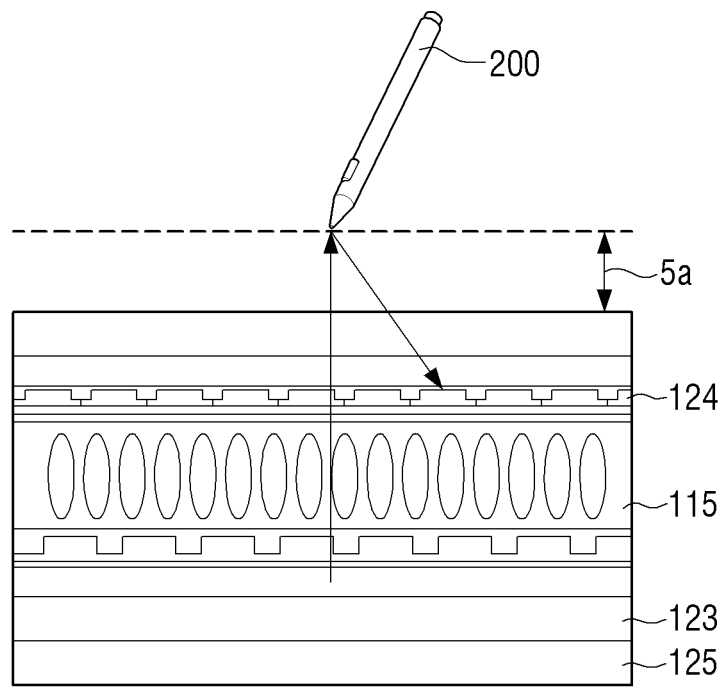

FIG. 42 illustrates an example of a constitution of a device configured to sense the approaching pen 200 by using the pen recognizing panel 121. Referring to FIG. 42, the display 110 may further include the electrical induction coil sensor 125. When the pen 200 approaches within a certain distance 5a, the magnetic field on the approaching point changes because of the magnetic coils within the pen 200, and the changed magnetic field is sensed on the point of the electrical induction coil sensor 125. The sensed magnetic field is processed by the electrical signal processing circuits and inputted to the controller 130. The approaching point of the pen 200 may be sensed based on the input values.

Further, the controller 130 may determine whether a direct touch is performed according to the amount of the changed values in the magnetic field. As illustrated in FIGS. 41 and 42, when the infrared source 123, the infrared sensor 124, and the pen recognizing panel 121 are used, the controller 130 may distinguish and recognize whether a user touches or approaches the screen with his body, e.g., the finger 50, or the pen 200. The controller 130 may selectively perform various control operations according to types of input and inputting methods.

Such an operation of the user terminal device 100 may be performed by implementing various types of software.

Figure 43:
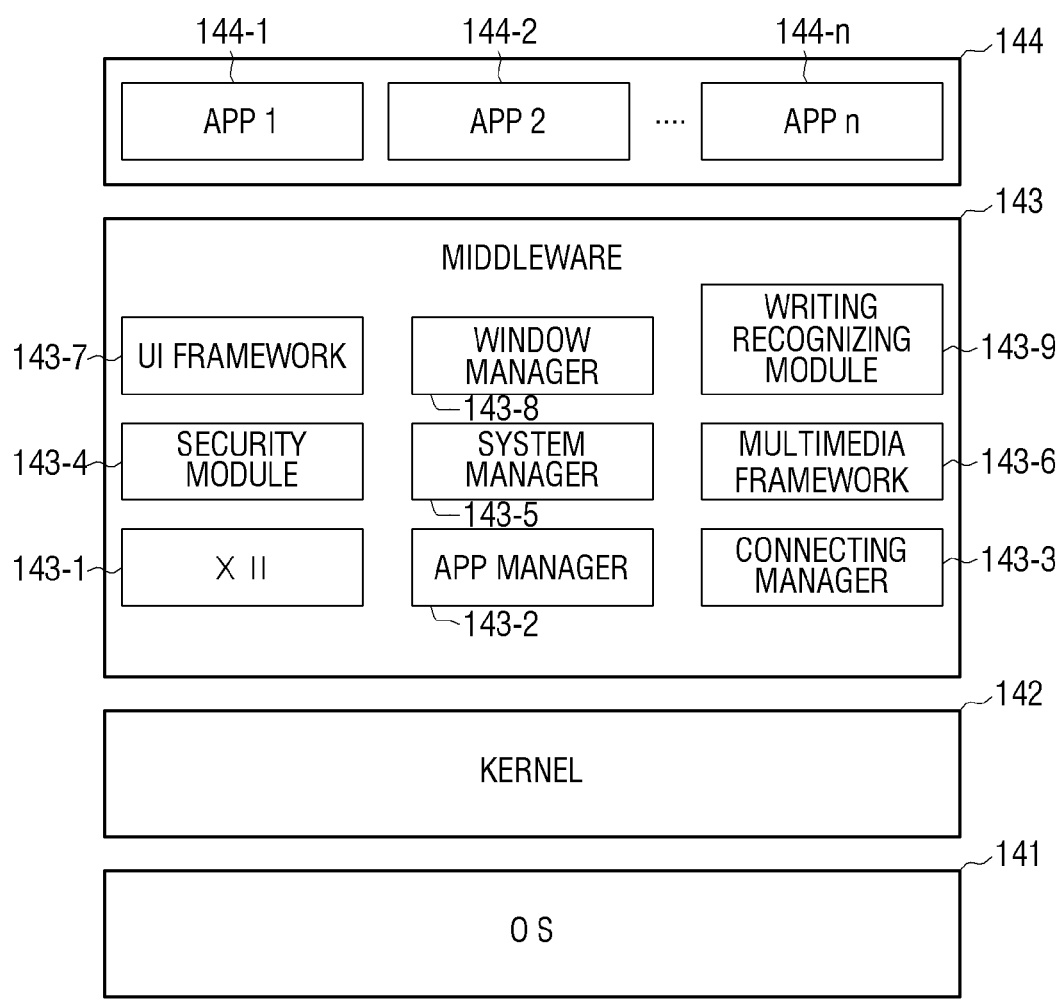
FIG. 43 illustrates an example of a software structure used in a user terminal device.

FIG. 43 illustrates an example regarding a software structure used in the user terminal device 100. The software of FIG. 43 may be stored in the storage 140; however, the software is not limited to being stored in the storage 140. The software may be stored in various types of storage media compatible with and usable within the user terminal device 100.

Referring to FIG. 43, the user terminal device 100 may store the software including an OS 141, a kernel 142, middleware 143 and an application 144.

OS (Operation System) 141 performs functions of controlling and managing a general operation of the hardware. Thus, OS 141 is a class which performs basic functions such as hardware managing, memory, and security.

The kernel 142 performs a gateway of transmitting various signals sensed in the sensor 120 to the middleware 143.

The middleware 143 includes various software modules which control an operation of the user terminal device 100. Referring to FIG. 43, the middleware 143 includes the X11 module 143-1, APP manager 143-2, connecting manager 143-3, security module 143-4, system manager 143-5, multimedia framework 143-6, UI framework 143-7, window manager 143-8, and writing recognizing module 143-9.

The X11 module 143-1 is a module which receives various event signals from various units of hardware included in the user terminal device 100. According to an exemplary embodiment, an event may be established, such as an event to sense user manipulation, an event to generate a system alarm, and an event to start or finish a specific program.

APP manager 143-2 is a module which manages a process of implementing various applications installed in the storage 140. When an event which causes an application implementing command to be input is sensed by X11 module 143-1, APP manager 143-2 calls and implements an application corresponding to the event. Thus, when, for example, an event to select one or more objects on the home screen is sensed, APP manager 143-2 performs the functions of calling and implementing an application corresponding to the object.

The connecting manager 143-3 is a module which supports a wired or wireless network connection. The connecting manager 143-3 may include various detailed modules such as a DNET module and a UPnP module.

The security module 143-4 is a module which supports certification, permission, and secure storage regarding the hardware.

The system manager 143-5 monitors situation of each unit within the user terminal device 100 and provides the monitoring results to the other modules. For example, when the battery amount is short, errors occur, or a communication connection is cut, the system manager 143-5 may provide the monitoring results to UI framework 143-7 and output an informing message or alarm sounds.

The multimedia framework 143-6 is a module which plays multimedia contents stored in the user terminal device 100 or provided from external sources. The multimedia framework 143-6 may include a player module, camcorder module, and sound processing module. Accordingly, the multimedia framework 143-6 may perform operations of playing back various multimedia contents, for example, generating and playing back images and sounds.

UI framework 143-7 is a module which provides various UIs. UI framework 143-7 may include an image compositor module constituting a plurality of objects, a coordinate compositor module calculating the coordinates at which objects are displayed, a rendering module rendering the constituted objects on the calculated coordinates, and a 2D/3D UI toolkit providing tools to constitute a 2D or 3D format of UI.

The window manager 143-8 may sense a touching event by using the user body or the pen, or other incoming events. The window manager 143-8 performs a corresponding operation corresponding to the event by transmitting event signals to UI framework 142-7, when such an event is sensed.

The writing recognizing module 143-9 is a module which parses the tracks drawn on the surface of the display 110 and recognizes the writing. The writing recognizing module 143-9 receives incoming coordinate values regarding the points at which the pen recognizing panel 121 is touched, and stores the coordinate values of the touched points as strokes. Further, the writing recognizing module 143-9 may generate stroke arrays by using the strokes. The writing recognizing module 143-9 may recognize the writing by comparing the previously stored writing in writing library and the generated stroke arrays. The recognized writing is provided to the application manager 143-2, and the application manager 143-2 provides the writing to an application corresponding to the object on the point at which which user writing is performed. Thus, as described above, the application may perform the control operation based on the recognized writing.

According to an exemplary embodiment, when a user touches or draws on the surface of the display 110 by using various input devices, such as the user's hand or the pen 200, UI framework 143-7 may draw various graphic lines according to the user manipulations. Specifically, when a user draws a picture on the screen by using the pen 200, the controller 130 may draw graphics lines on every point through which the pen 200 passes by implementing UI framework 143-7. A thickness of the lines may vary according to the pressure pushed on the screen with the pen 200 or the size of the dimensions of the screen and the pen during contact. Colors or shapes of the lines may also vary according to user preferences.

Further, when an event to provide animation effects to a specific object occurs, UI framework 143-7 may display lively animation by modifying various display features such as displaying a position, shape, color and size regarding the object.

The application module 144 includes applications 144-1~144-n to support various functions. For example, the application module 144 may include program modules to provide various services such as navigation program module, game module, electronic book module, calendar module, and alarm managing module. Such applications may be installed as default applications, and may be installed and used by a user while using the device. When an object is selected, CPU 133 may implement a corresponding application to the selected object by using the application module 144.

Since the software structure of FIG. 43 is merely exemplary, the software structure according to other exemplary embodiments is not limited to the structure shown in FIG. 43. Thus, some units may be deleted or modified, and new units may be added according to necessity or preference. For example, the storage 140 may additionally provide various programs, e.g., a sensing module to analyze sensed signals in the various sensors, a messaging module such as a messenger program, an SMS (short message service) & MMS (multimedia message service) program, an e-mail program, a call info aggregator program module, a VoIP module, and a web browser module.

In summary, exemplary embodiments provide techniques of distinguishing when a pen is used to provide input, and the controller 130 may provide various animation effects according to various pen incoming events.

According to an exemplary embodiment, the user terminal device 100 may be implemented as various types of devices such as a mobile phone, tablet PC, laptop PC, PDA, MP3 player, electronic frame device, TV, PC, or kiosk. According to an exemplary embodiment, when the user terminal device 100 is implemented to be a device with various functions, such as, for example, a mobile phone or tablet PC equipped with a communication function and a contents playback function, units to perform these functions may be additionally included in the user terminal device.

Figure 44:
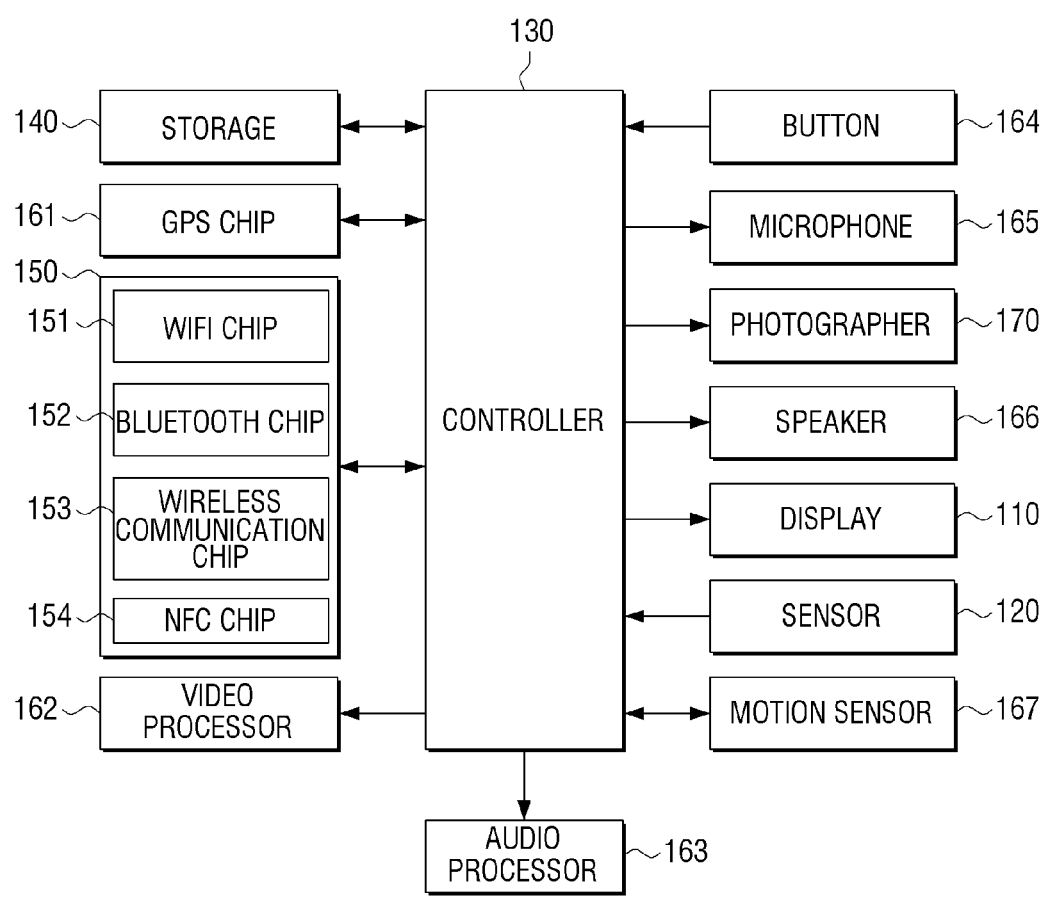
FIG. 44 is a block diagram provided to comprehensively explain a constitution of a user terminal device according to various exemplary embodiments.

FIG. 44 is a block diagram of an example of the user terminal device comprehensively including various units.

Referring to FIG. 44, the user terminal device 100 may include the display 110, the sensor 120, the controller 130, the storage 140, a communicator 150, GPS chip 161, a video processor 162, an audio processor 163, a button 164, a microphone 165, a speaker 166, a motion sensor 167, and a photographer 170.

The display 110 and the sensor 120 may be implemented to be touch screen type displays according to the above explanations, may display various screens, and may sense user manipulation performed with respect to the screens. The controller 130 controls a general operation of the user terminal device 100 by using various programs and data stored in the storage 140. The display 110, the sensor 120 and the controller 130 are specifically described in the above various exemplary embodiments, which will not be further explained.

The communicator 150 performs communication with various types of external devices according to various types of communication methods. The communicator 150 includes, for example, WiFi chip 151, Bluetooth chip 152, wireless communication chip 153, and NFC chip 154.

WiFi chip 151 and Bluetooth chip 152 perform communication according to a WiFi method and a Bluetooth method, respectively. When WiFi chip 151 and Bluetooth chip 152 are used, a plurality of connecting information such as an SSID and a session key may be first transmitted and received, and a plurality of information may be transmitted and received after connecting by using the connecting information. The term 'wireless communication chip 153' refers to a chip which performs communication according to at least one of various communication standards such as, for example, IEEE, Zigbee, 3G ($3^{rd}$ Generation), 3GPP ($3^{rd}$ Generation Partnership Project), and LTE (Long Term Evolution). The term 'NFC chip 154' refers to a chip which operates according to an NFC (Near Field Communication) method using 13.56 MHz bandwidth among various RF-ID frequency bandwidths such as 135 kHz, 13.56 MHz, 433 MHz, 860~960 MHz, and 2.45 GHz.

The controller 130 performs communication with a plurality of external devices through the communicator 150. For example, the controller 130 may download applications, install the applications in the storage 140, and display objects corresponding to the applications. In this case, corresponding applications may be matching the objects previously used.

Specifically, the communicator 150 may perform communication with an external server. The server may be a device which provides a sharing service to share the home screen including objects drawn by the other users. In this case, when a sharing command regarding the animation data created by a user on the user terminal device 100 or other additional screen data is inputted, the controller 130 may upload the selected data to the server with the communicator 150.

Further, the animation data created by the other user may be transmitted from the server. When new animation data is downloaded, and a user matches the downloaded animation data with a specific object, the controller 130 provides animation effects based on new animation data regarding corresponding object.

Additionally, the communicator 150 may share animation data by directly performing communication with the other user terminal devices instead of the server.

GPS chip 161 receives GPS signals from GPS (Global Positioning System) satellites, and calculates a current position of the user terminal device 100. When the navigation program is used or a current position of a user is requested, the controller 130 may calculate the user position by using the GPS chip 161.

The video processor 162 processes the received contents through the communicator 150 or video data included in the stored contents of the storage 140. The video processor 162 may perform various image processing operations; for example, decoding of video data, scaling, noise filtering, frame rate converting, and modifying a resolution.

The audio processor 163 processes the received contents through the communicator 150 and audio data included in the stored contents of the storage 140. The audio processor 163 may perform various processing techniques; for example, decoding or amplifying of audio data and noise filtering.

When the playback program is implemented to play back multimedia contents, the controller 130 may play corresponding contents by driving the video processor 162 and the audio processor 163. The display 110 may display the image frames generated in the video processor 162.

Further, the speaker 166 outputs the audio data generated in the audio processor 163.

The button 164 may be various types of buttons; for example, a mechanical button, touch pad, and wheel, which are formed on areas such as, for example, a front, a side, a back, a bottom, or a top on the exterior main body of the user terminal device 100.

The microphone 165 receives incoming user voice data or other sounds and converts the incoming user voice data or other sounds into audio data. The controller 130 may use the user voice data inputted through the microphone 165 while calling, or convert the user voice data into audio data and store the audio data in the storage 140.

The photographer 170 photographs still images or video images according to the control of a user. The photographer 170 may be implemented to be plural cameras, such as a front side camera and a back side camera. As described above, the photographer 170 may be used as a device to obtain user images in connection with the exemplary embodiments which track the user gaze.

When the photographer 170 and the microphone 165 are provided, the controller 130 may perform a control operation according to the user voices inputted through the microphone 165 or the user motion recognized by the photographer 170. Thus, the user terminal device 100 may operate in a motion controlling mode or a voice controlling mode. When operating in the motion controlling mode, the controller 130 photographs a user by activating the photographer 170, and performs a corresponding control operation by tracking changes in the user motion. When operating in the voice controlling mode, the controller 130 may operate in a voice recognizing mode to analyze the user voices inputted through the microphone 165 and perform a control operation according to the analyzed user voices.

In the user terminal device 100 supporting the motion controlling mode and the voice controlling mode, voice recognizing technologies and motion recognizing technologies may be applied in the above various exemplary embodiments. For example, when a user makes a motion to select an object displayed on the home screen, or speaks a voice command corresponding to an object, the user terminal device 100 may determine that the corresponding object is selected and perform the control operation matching the object.

The motion sensor 167 senses movement of the main body in the user terminal device 100. The user terminal device 100 may rotate or slide in various directions. The motion sensor 167 may sense movement features, e.g., direction and angle of the rotating, and a gradient by using one or more of various types of sensors, such as a geomagnetic sensor, gyro sensor, and acceleration sensor.

Although not illustrated in FIG. 44, the user terminal device 100 may further include a USB port to which a USB connector can be connected, various external inputting ports to connect with various external components such as a headset, mouse, and LAN, and a DMB chip to receive and process DMB (Digital Multimedia Broadcasting) signals, according to the exemplary embodiments.

In summary, the above exemplary embodiments may be implemented by various types of user terminal devices.

Further, the user terminal device may provide various animation effects according to user manipulation, and a user may directly create animation data. The created animation data may be shared with the others.

Figure 45:
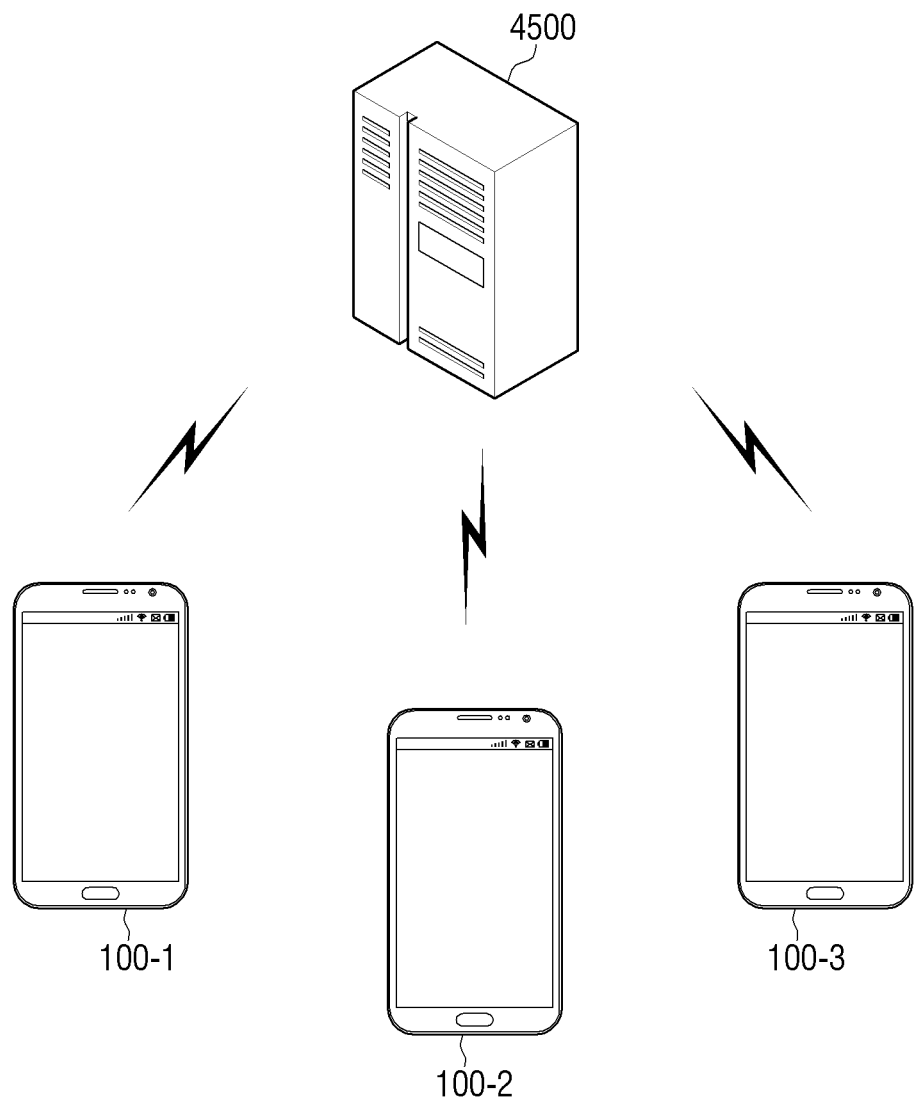
FIG. 45 illustrates a constitution of a data sharing system according to an exemplary embodiment.

FIG. 45 is a diagram illustrating an example regarding a data sharing system according to an exemplary embodiment. Referring to FIG. 45, the data sharing system includes a plurality of user terminal devices 100-1, 100-2, and 100-3 and the server 4500. Although FIG. 45 illustrates three user terminal devices 100-1~100-3, the number of user terminal devices is not limited to three and may be modified.

The server 4500 provides a data sharing service so that the user terminal devices 100-1~100-3 share the created data internally with each other. The server 4500 may be implemented as various types; for example, the server 4500 may be a web server, cloud server and other types of servers.

In the data sharing system of FIG. 45, each of the user terminal devices may be implemented according to the various constitutions described above with respect to the exemplary embodiments. When one of the user terminal devices 100-1~100-3, e.g., terminal device 100-1, is used to create the home screen or the animation data, a user may upload the created data to the server 4500. Users of the other user terminal devices 100-2, 100-3 may download the data by accessing the site provided from the server 4500.

Figure 46:
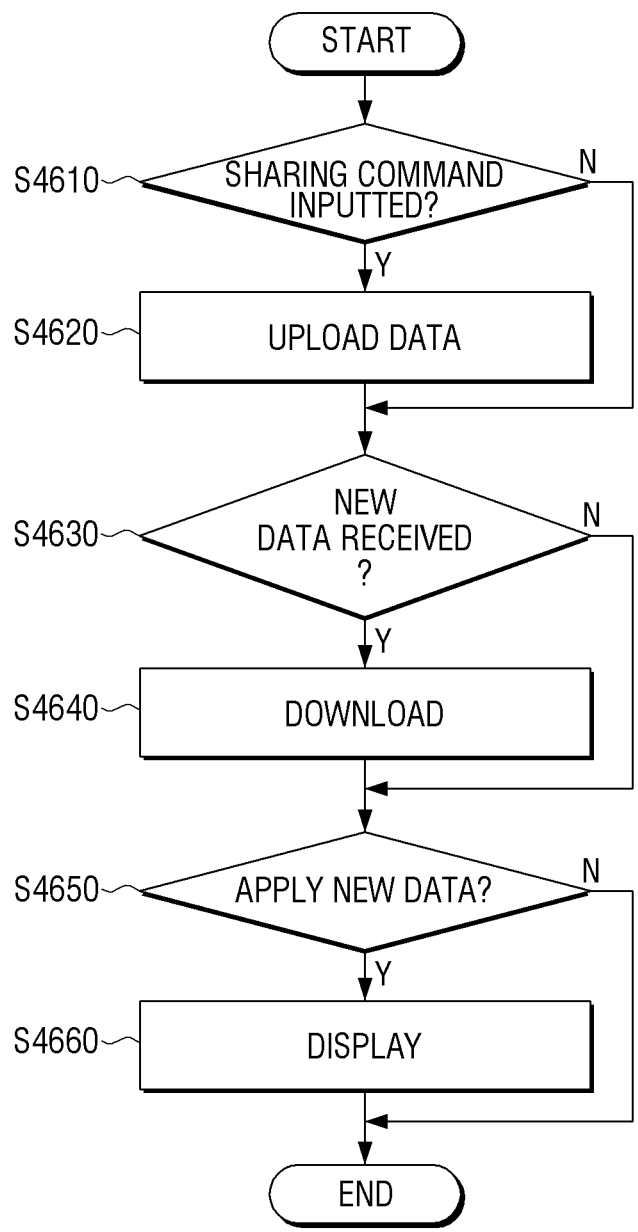
FIG. 46 is a flowchart provided to explain a method of sharing home screen data.

FIG. 46 is a flowchart provided to explain an example of a data sharing method. Referring to FIG. 46, when a sharing command regarding the stored data is input at operation S4610, the user terminal device uploads the data to the server 4500 at operation S4620. Accordingly, the home screen data constituting the home screen drawn by a user or the animation data created by a user may be uploaded. When key frames drawn by a user are included in the animation data, such key frames may be uploaded together with the other uploaded data. When a user establishes an order of displaying an animation, information regarding the display order may also be uploaded together with the other uploaded data.

Further, when a user command to share the data uploaded by another user is input at operation S4630, the user terminal device 100 downloads new data from the server 4500 at operation S4640.

A user may determine whether the downloaded data is applied or not at operation S4650. When a user command to use new data is input, the user terminal device displays the screen by using new data at operation S4660. Specifically, when the home screen data is received and selected, the controller 130 displays a new home screen based on the received home screen data. Further, when animation data is received and selected, the controller 130 provides animation effects based on the received animation data. The examples regarding animation effects are described in the above various exemplary embodiments, which will not be redundantly explained.

Therefore, a user may create screens or objects according to his or her intentions and share the created screens or objects with the other uses in a convenient fashion.

The server 4500 may provide profit modeling; for example, the server 4500 may receive a payment while facilitating the buying or selling of data for each of the user terminal devices 100, or obtain advertising profits while providing a server area in which home screen data or animation data can be uploaded or downloaded freely. The server 4500 may provide numerous different financial functions to facilitate the buying or selling of data for each of the terminal devices 100, including for example, functioning as a billing intermediary on behalf of a buyer and/or seller of the data or communicating with another entity functioning as a billing intermediary; storing account data and other financially-related information of users; providing or operating in conjunction with security mechanisms, such as encryption protocols, to facilitate secure transactions of data over a network, such as the Internet; providing alerts, updates, confirmations, and other messaging services between buyers and sellers; and providing numerous other financially-related functions known to those skilled in the art.

According to an exemplary embodiment, when the home screen data created by the other users is received, the user terminal device 100 may receive and use various data such as applications matching objects, additional data, and animation information. In this case, home screen data, applications and contents may be uploaded or downloaded in one total package format. When applications matching objects are already installed, the user terminal device may automatically match the objects with previous applications without additional downloading. According to an exemplary embodiment, when there is no previously installed application for the objects, the user terminal device may display a message encouraging downloading of corresponding applications or download the corresponding applications automatically from the server.

Further, the user terminal device may only receive object information. In this case, a control operation matching each object may be directly selected and matched by a user.

Further, although FIG. 45 illustrates the exemplary embodiment of receiving data through the server, the user terminal devices may transmit and receive data by directly communicating with each other.

For example, when a user inputs a sharing command in the first user terminal device 100-1, the controller 130 displays a screen which enables a user to select another user with whom the data is to be shared. Accordingly, when another user, for example, a user having the second user terminal device 100-2, is selected, the first user terminal device 100-1 transmits the stored home screen data to the second user terminal device 100-2. Accordingly, the user terminal devices may share their own created home screens with their friends in a very convenient fashion.

Figure 47:
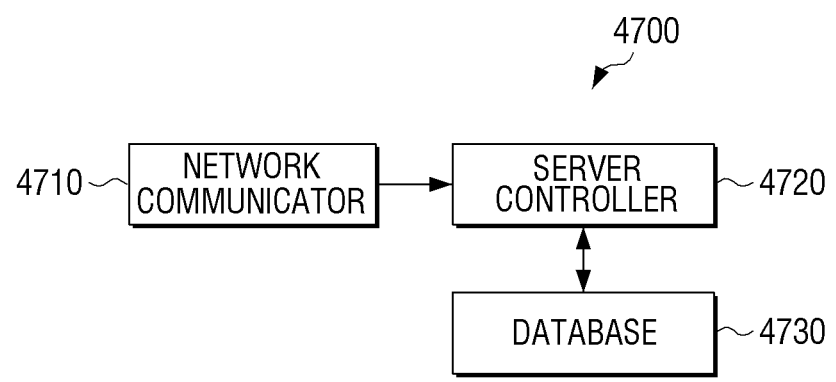
FIG. 47 is a block diagram of an example regarding a constitution of a server used in the data sharing system.

FIG. 47 is a block diagram of the server according to an exemplary embodiment. Referring to FIG. 47, the server 4700 includes a network communicator 4710, a server controller 4720, and a database 4730.

The network communicator 4710 performs communication with a plurality of user terminal devices 100-1~100-3 according to various communication methods.

The database 4730 stores various data uploaded from users.

The server controller 4720 records the data on the database 4730 when home screen data or animation data is uploaded through the network communicator 4710. The server controller 4720 may provide the recorded data on the database 4730 to the user terminal device 100 when a user terminal device 100 accesses the server through the network communicator 4710.

The user terminal device 100 may display information provided from the server 4700 on the screen. When a user selects home screen data or animation data, the user terminal device 100 transmits a downloading request regarding the selected data. The server controller 4720 extracts the selected data from the database 4730 and transmits the data to the user terminal device 100 according to the downloading request.

In summary, users can share home screen data or animation data, which are created by the users, with each other according to a convenient technique.

As described above, according to the various exemplary embodiments, a user may provide animation effects in various formats according to his or her intentions and preferences. Accordingly, user satisfaction can be enhanced when using the user terminal device.

The object creating method, the home screen creating method, the display method, and the controlling method regarding the user terminal device according to the above various exemplary embodiments may be coded as software and stored in non-transitory computer readable recording media. Such non-transitory computer readable recording media may be provided and used in various devices.

For example, non-transitory computer readable recording media may store and provide program codes to implement the displaying of a home screen including one or more objects drawn by a user, to implement a control operation to provide animation effects regarding the objects when a preset event occurs, and to implement control operations matching the objects when the objects are selected. Additionally, the display method, the controlling method, and the widget display method described in the above various exemplary embodiments may be coded as programs and stored in non-transitory computer readable recording media.

According to an exemplary embodiment, the term 'non-transitory computer readable recording medium' refers to a medium which stores data semi-permanently and can be read by devices. Specifically, the above various applications or programs may be stored and provided in non-transitory computer readable recording media such as a CD, DVD, hard disk, Blu-ray disk, USB, memory card, or ROM.

Further, the foregoing exemplary embodiments and advantages are merely exemplary and are not to be construed as limiting the exemplary embodiments. The present teachings can be readily applied to other types of apparatuses. Also, the description of the exemplary embodiments of the present inventive concept is intended to be illustrative, and not to limit the scope of the claims.

What is claimed is:

1. A user terminal device, comprising:
   a display configured to display a screen for selecting an object among a plurality of objects corresponding to a plurality of applications, respectively, in order to execute the plurality of applications;
   a sensor configured to receive a drawing manipulation to create a first image and a plurality of second images corresponding to the first image; and
   a controller comprising a hardware processor configured to set and display the first image as at least one object from among the plurality of objects, and when a hovering with respect to the first image is sensed, display the plurality of second images consecutively instead of displaying the first image while the hovering is maintained, and implement an application corresponding to the first image, among the plurality of applications, when sensing a touch manipulation on the first image or one of the plurality of second images,
   wherein the controller is further configured to group the first image and the plurality of second images together and match the grouped images with the application based on matching information received from a user,
   wherein the plurality of second images comprises a plurality of key frames drawn by a user in order to express animation effects that indicate control operation information of the application corresponding to the first image, and
   wherein the controller displays the key frames to move to different positions on the display to thereby express the animation effects.

2. The user terminal device of claim 1, wherein the controller consecutively displays the plurality of second images according to a display order established by a user, while the hovering is maintained.

3. The user terminal device of claim 1, wherein the controller displays a name of the application while consecutively displaying the plurality of second images.

4. A user terminal device, comprising:
   a display configured to display a screen for selecting an icon among a plurality of icons corresponding to a plurality of applications, respectively, in order to execute the plurality of applications;
   a sensor configured to sense user manipulation; and
   a controller comprising a hardware processor configured to set and display images drawn by a user as at least one icon from among the plurality of icons, provide animation effects regarding the images when a hovering with respect to the images is sensed, and perform a control operation matching the images when the images are selected by the user manipulation,
   wherein the controller is further configured to group the images together and match the grouped images with the application based on matching information received from a user,
   wherein the images comprise a plurality of key frames drawn by a user in order to express animation effects that indicate control operation information of the application corresponding to the images, and
   wherein the controller displays the key frames to move to different positions on the display to thereby express the animation effects.

5. A user terminal device, comprising:
   a display configured to display a screen including an object corresponding to an application in order to execute the application;
   a sensor configured to sense a touch with respect to the object; and
   a controller comprising a hardware processor configured to provide first animation effects regarding the object when the object is touched, provide second animation effects when the touch on the objects ceases, and implement the application corresponding to the object,
   wherein the controller is further configured to match the object with the application based on matching information received from a user and is further configured to group images drawn by a user together and match the grouped images with the application based on the matching information, wherein the images comprise a plurality of key frames drawn by a user in order to express the first animation effects that indicate control operation information of the application corresponding to the images, and wherein the controller displays the key frames to move to different positions on the display to thereby express the animation effects.

6. The user terminal device of claim 5, wherein the first and the second animation effects comprise effects of consecutively displaying the plurality of key frames drawn by the user or effects of displaying a plurality of images according to an animation order established by the user.

7. A user terminal device, comprising:
a display configured to display a widget;
a sensor configured to sense a drawing manipulation to create a first image and a plurality of second images corresponding to the first image;
a receiver configured to receive situation information;
a storage configured to store a plurality of objects created by the drawing manipulation; and
a controller comprising a hardware processor configured to update the widget by combining parts of the plurality of objects according to the received situation information,
wherein the situation information comprises information indicating a characteristic of a surrounding environment in which the user terminal device is located,
wherein the controller is further configured to group the first image and the plurality of second images together and match the grouped images with the widget based on matching information received from a user,
wherein the plurality of second images comprises a plurality of key frames drawn by a user in order to express animation effects that indicate control operation information of the widget corresponding to the first image, and
wherein the controller displays the key frames to move to different positions on the display to thereby express the animation effects.

8. The user terminal device of claim 7, wherein the plurality of objects comprises signs, numbers and characters, the widget is a unified widget including the weather, the date, and the time, and
the controller creates the unified widget by combining one or more of the signs, the numbers and the characters based on one or more of current time, weather, and date information.

9. A display method to be performed by a user terminal device, the display method comprising:
receiving an incoming drawing manipulation to create a first image and to create a plurality of second images corresponding to the first image;
setting and displaying, using a hardware processor, the first image as at least one object on a screen for selecting an object among a plurality of objects corresponding to a plurality of applications, respectively, in order to execute the plurality of applications;
when a hovering with respect to the first image is sensed, displaying the plurality of second images consecutively instead of displaying the first image while the hovering is maintained;
implementing an application corresponding to the first image, among the plurality of applications, when sensing a touch manipulation on the first image or one of the plurality of second images; and
grouping the first image and the plurality of second images together and matching the grouped images with the application based on matching information received from a user,
wherein the plurality of second images comprises a plurality of key frames drawn by a user in order to express animation effects that indicate control operation information of the application corresponding to the first image, and
wherein the method further comprises displaying the key frames to move to different positions on a display to thereby express the animation effects.

10. The display method of claim 9, wherein the plurality of second images are consecutively displayed according to a display order established by a user.

11. The display method of claim 9, further comprising:
displaying a name of the application along with the plurality of second images.

* * * * *